(12) United States Patent
Song et al.

(10) Patent No.: US 8,617,307 B2
(45) Date of Patent: Dec. 31, 2013

(54) ALKALI-ACTIVATED BINDER, ALKALI-ACTIVATED MORTAR, CONCRETE PRODUCTS AND WET RED CLAY PAVING MATERIAL USING BINDER

(75) Inventors: Jin Kyu Song, Gwangju (KR); Keun Hyeok Yang, Seoul (KR)

(73) Assignee: Industry Foundation of Chonnam National University, Gwangju (KR)

( * ) Notice: Subject to any disclaimer, the term of this patent is extended or adjusted under 35 U.S.C. 154(b) by 0 days.

(21) Appl. No.: 13/146,998

(22) PCT Filed: Jan. 29, 2010

(86) PCT No.: PCT/KR2010/000536
§ 371 (c)(1),
(2), (4) Date: Jul. 29, 2011

(87) PCT Pub. No.: WO2010/087636
PCT Pub. Date: Aug. 5, 2010

(65) Prior Publication Data
US 2011/0287198 A1    Nov. 24, 2011

(30) Foreign Application Priority Data

| Jan. 30, 2009 | (KR) | 10-2009-0007488 |
| May 6, 2009 | (KR) | 10-2009-0039488 |
| Jun. 26, 2009 | (KR) | 10-2009-0057913 |
| Nov. 26, 2009 | (KR) | 10-2009-0114972 |
| Dec. 10, 2009 | (KR) | 10-2009-0122736 |

(51) Int. Cl.
*C04B 18/14* (2006.01)
*C04B 28/22* (2006.01)
*C04B 18/08* (2006.01)
*C04B 38/00* (2006.01)
*E01C 7/00* (2006.01)

(52) U.S. Cl.
USPC ............ 106/705; 106/624; 106/706; 106/707; 106/708; 106/711; 106/789; 106/790

(58) Field of Classification Search
USPC ......... 106/602, 705, 706, 707, 711, 789, 790, 106/791, 624, 708
See application file for complete search history.

(56) References Cited

U.S. PATENT DOCUMENTS

| 4,715,896 A | 12/1987 | Berry | |
| 2002/0056404 A1* | 5/2002 | Chatterji et al. | 106/705 |
| 2005/0252420 A1* | 11/2005 | Timmons | 106/705 |
| 2007/0095255 A1* | 5/2007 | Abbate et al. | 106/713 |

FOREIGN PATENT DOCUMENTS

| CN | 101037308 A | | 9/2007 |
| JP | 57017461 A | * | 1/1982 |
| JP | 58-84167 A | * | 5/1983 |
| JP | 1-208354 A | * | 8/1989 |
| JP | 10-316967 A | * | 12/1998 |
| JP | 11-217563 A | * | 8/1999 |
| JP | 2002-241151 A | | 8/2002 |
| JP | 2005-119922 A | | 5/2005 |
| JP | 2007-261884 A | * | 10/2007 |
| JP | 2009-155414 A | * | 7/2009 |
| KR | 10-2001-0079397 A | | 8/2001 |
| KR | 2001-0079397 A | | 8/2001 |
| KR | 10-2003-70204 A | | 8/2003 |
| KR | 10-2007-0047029 A | | 8/2003 |
| KR | 0408594 B1 | | 11/2003 |
| KR | 10-2007-12310 A | | 1/2007 |
| KR | 0741637 B1 | | 7/2007 |
| KR | 10-2008-100117 A | | 11/2007 |
| KR | 0882888 B1 | | 2/2009 |
| KR | 0924133 B1 | | 10/2009 |
| SU | 258909 A | * | 5/1970 |
| SU | 451658 A | * | 3/1975 |
| SU | 612911 A | * | 6/1978 |
| SU | 623837 A | * | 9/1978 |
| SU | 975668 A | * | 11/1982 |
| SU | 1578098 A | * | 7/1990 |
| SU | 1701677 A1 | * | 12/1991 |
| WO | WO2008/089481 A1 | * | 7/2008 |
| WO | WO2008/128287 A1 | * | 10/2008 |
| WO | 2009/005205 A1 | | 1/2009 |

OTHER PUBLICATIONS

Derwent-Acc-No. 2007-422187, abstract of Chinese Patent Specification No. CN 1903773 (Jan. 2007).*
Derwent-Acc-No. 2002-145998, abstract of Korean Patent Specification No. KR 2001079397 A (Aug. 2001).*
Derwent-Acc-No. 2009-N12505, abstract of Korean Patent Specification No. KR 912931 B1 (Aug. 2009).*
Derwent-Acc-No. 2009-M29585, abstract of Korean Patent Specification No. KR 909212 (Jul. 2009).*
Derwent-Acc-No. 2000-449819, abstract of Romanian Patent Specification No. RO 115716 B1 (May 2000).*
Derwent-Acc-No. 2008-E02716, abstract of CN 101041580A (Sep. 2007).*

(Continued)

*Primary Examiner* — Anthony J Green
(74) *Attorney, Agent, or Firm* — Vorys, Sater, Seymour and Pease LLP; Mihsun Koh

(57) ABSTRACT

The present invention relates to an alkali-activated binder which can be used as a binder for replacing cement, and more particularly, to an alkali-activated binder, and to mortar, concrete, concrete products, and wet loess paving material comprising the binder, in which inorganic sodium-free alkaline materials are contained to reduce the total amount of $Na_2O$ and $K_2O$ in concrete, thus improving the workability and the strength stability and inhibiting the alkali-aggregate reaction.

14 Claims, 16 Drawing Sheets

(56) References Cited

OTHER PUBLICATIONS

Derwent-Acc-No. 2008-G89391, abstract of CN 101182161A (May 2008).*
Derwent-Acc-No. 2008-K50755, abstract of CN 101250035A (Aug. 2008).*
Derwent-Acc-No. 2009-E28155, abstract of CN 101337802A (Jan. 2009).*
Derwent-Acc-No. 2009-G05194, abstract of CN 101376582A (Mar. 2009).*
Derwent-Acc-No. 2008-M35634, abstract of CN 101492280A (Jul. 2009).*
Derwent-Acc-No. 2009-N82013, abstract of CN 101525217A (Sep. 2009).*
Derwent-Acc-No. 2006-546044, abstract of KR 2005080701A (Aug. 2005).*
PCT International Search Report, (Sep. 2010).

* cited by examiner

ALKALI-ACTIVATED BINDER, ALKALI-ACTIVATED MORTAR, CONCRETE PRODUCTS AND WET RED CLAY PAVING MATERIAL USING BINDER

CROSS-REFERENCE

This is a National Phase Application filed under 35 U.S.C. 371 as a national stage of PCT/KR2010/000536, filed on Jan. 29, 2010, and claims benefit from Korean Patent Application No. 10-2009-0007488, filed on Jan. 30, 2009, and claims benefit form Korean Patent Application No. 10-2009-0039488, filed on May 6, 2009, and claims benefit from Korean Patent Application No. 10-2009-0057913, filed on Jun. 26, 2009, and claims benefit from Korean Patent Application No. 10-2009-0114972, filed on Nov. 26, 2009, and claims benefit from Korean Patent Application No. 10-2009-0122736, filed on Dec. 10, 2009, the entire content of which is hereby incorporated by reference in its entirety.

TECHNICAL FIELD

The present invention relates to an alkali-activated binder, which is usable as a binder in lieu of cement, to and, more particularly, to an alkali-activated binder, in which a sodium-free inorganic alkaline material is contained to reduce the total amount of $Na_2O$ and $K_2O$ in concrete, thus improving the workability and the strength stability and inhibiting alkali-aggregate reactions, and to mortar, concrete, concrete products, and wet loess paving materials, including the binder.

BACKGROUND ART

Generally, mortar and concrete used for construction industries consist of a binder, water, and aggregate. As such, a typical inorganic binder, namely, cement (or cement clinker) consumes immense energy in the course of thermally treating limestone composed mainly of $CaCO_3$ in the manufacturing process, and a large amount of $CO_2$ gas is generated to the extent of 44 wt % or more of the amount of manufactured cement. The $CO_2$ gas thus generated corresponds to about 7% of the total worldwide greenhouse gas emissions.

Specifically, cement is powder obtained by mixing silica, alumina, and lime as main components in an appropriate ratio, partially melting and sintering the mixture thus obtaining clinker, adding an appropriate amount of plaster to the clinker, and grinding the clinker. The manufacture of the cement clinker requires melting at a high temperature of about 1450° C., undesirably consuming a large amount of energy (about 30~35 l/ton of oil). As well, upon manufacturing 1 ton of cement, about 700~870 kg of $CO_2$ is known to be emitted by just the chemical reaction of limestone and silicic acid.

The restriction placed on emissions of the greenhouse gas $CO_2$ is regarded as very important in the field of cement manufacturing. Depending on the $CO_2$ emission standards set by cement manufacturers, it is thought that the production of cement clinker will inevitably be reduced in the future. On the other hand, the demand for cement around the world is expected to increase by about 2.5~5.8% per year up to the early $21^{st}$ century, and thus, in order to satisfy an observance of the Kyoto protocol and an increase in the demand for cement, the development of a novel inorganic binder that reduces $CO_2$ emission or does not emit $CO_2$ is urgent.

In this regard, thorough research into alkali-activated binders without the use of cement, in order to substitute for cement, is ongoing. In particular, Korean Patent Application No. 2007-65185 discloses an alkali-activated binder comprising blast furnace slag and an inorganic alkaline material including a sodium-based material, in which the inorganic alkaline material includes one or more of sodium silicate and liquid type water glass, and the weight ratio of sodium-based material contained in the inorganic alkaline material to blast furnace slag is 0.038~0.088, and the weight of sodium-based material is determined by being converted into $Na_2O$.

Cement-free alkali-activated binders known to date including the above patent may be used in lieu of conventional common Portland cement, thus solving the problem of the disposal of industrial waste, thereby reducing the environmental load. Moreover, upon manufacturing the binder, energy can be saved and $CO_2$ emissions can be prevented, thus exhibiting environmentally friendly properties. However, because the inorganic alkaline material used for the conventional alkali-activated binder contains sodium, when such a binder is used, it is difficult to control the total amount of alkali which should be restricted to inhibit the alkali-aggregate reaction in concrete. Specifically, in the inhibition of the alkali-aggregate reaction, the equivalent of $Na_2O$ per 1 $m^3$ of concrete should be 0.3 kg or less. If the total amount of alkali falls outside of the restriction range, drastic slump loss may occur, undesirably deteriorating the quality of concrete.

On the other hand, known conventional loess paving materials include loess and cement which are mixed, and thus for them the above problems are unchanged because cement is used.

Also, drying shrinkage of concrete is affected by the amount of water used, the amount of binder, the fineness of binder, and the amount of aggregate, and may increase in proportion to increases in the amount of water used, the amount of binder and the fineness of binder and a decrease in the amount of aggregate. In particular, upon manufacturing concrete using loess, large drying shrinkage of loess must be controlled.

Road paving causes high drying shrinkage cracking and requires high tensile strength and flexural strength, and, in particular, surface drying shrinkage cracking imposes a poor outer appearance rather than structural problems, undesirably incurring distrust in builders and requiring repair of defects.

Furthermore, conventional loess paving materials include cement and loess, making it difficult to ensure necessary slump due to an increase in specific surface area in terms of properties of loess containing minute particles unlike sand. Moreover, in order to control drying shrinkage cracking depending on an increase in unit-water, a dry process is considered optimal. However, the dry process makes it difficult to manage the water content of the material. If the materials are not completely mixed, uniform quality cannot be ensured. Also, it is difficult to construct a paving material due to low slump, and pressure is applied using various devices, undesirably increasing the construction cost.

Therefore, there is a need to develop a novel alkali-activated binder, which is not influenced by the restriction of the total amount of alkali, may exhibit more stable workability and strength and is inexpensive thus reducing the production cost, and a novel loess paving material including the same.

DISCLOSURE

Technical Problem

Culminating in the present invention, intensive and thorough research was carried out by the present inventors aiming to solve the problems encountered in the related art, which led to the development of an alkali-activated binder having a novel composition, which is not influenced by the restriction of the total amount of alkali.

Accordingly, an object of the present invention is to provide an alkali-activated binder, in which an inorganic alkaline material for adjusting the hardening rate of the alkali-activated binder is used in an amount that is able to maintain compressive strength, thus exhibiting both superior workability and high strength stability, and also to provide an alkali-activated mortar, concrete, and concrete product, including the above binder.

Another object of the present invention is to provide an alkali-activated binder, in which the total amount of $Na_2O$ and $K_2O$ in concrete is reduced thus inhibiting alkali-aggregate reaction in concrete to thereby effectively control the alkali-aggregate reaction, and also to provide an alkali-activated mortar, concrete, and concrete product, including the above binder.

In addition, another object of the present invention is to provide an alkali-activated binder, which controls rapid sintering caused by a sodium-based material and activates a Pozzolanic reaction thus improving strength and profitability, and also to provide an alkali-activated mortar, concrete, and concrete product, including the above binder.

In addition, another object of the present invention is to provide an alkali-activated binder, which includes an inorganic alkaline material containing magnesium that is comparatively inexpensive, thus reducing the production cost, and also to provide an alkali-activated mortar, concrete, and concrete product, including the above binder.

In addition, another object of the present invention is to provide an alkali-activated masonry product and a wet loess paving material, in which profitability and compressive strength of the masonry product are increased, strength is more stable, and rapid sintering is controlled, thus manifesting improved workability and increased productivity, compared to when using conventional alkali-activated binders including only a sodium-containing inorganic alkaline material.

In addition, another object of the present invention is to provide an alkali-activated wet loess paving material, which is environmentally friendly because of recycling industrial byproducts and adding no cement, exhibits superior initial strength and long-term strength compared to OPC cement and higher durability and chemical resistance than OPC cement, has a heat of hydration about ½~⅓ of that of OPC cement, and is less affected by the quality of aggregate and thus is not reduced in strength even in the presence of about 20% clay or impurities in the aggregate.

In addition, another object of the present invention is to provide an alkali-activated wet loess paving material, which includes fibers that are easily dispersed to control surface drying shrinkage cracking and enhance tensile strength and flexural strength.

In addition, another object of the present invention is to provide an alkali-activated wet loess paving material, in which part of the total amount of loess is replaced with fine aggregate having a particle size similar to that of the loess, thus controlling drying shrinkage and increasing compressive strength while maintaining the inherent color of the loess.

In addition, another object of the present invention is to provide an alkali-activated wet loess paving material, which is applied, in lieu of asphalt or concrete, to places that do not have heavy traffic loads, such as walkways, sidewalks, park roads, bicycle roads, etc., and also places requiring high strength to enable the passage of heavy vehicles.

The objects of the present invention are not limited to the above objects, and the other objects which are not mentioned herein will be apparently understood by those skilled in the art from the following description.

Technical Solution

In order to accomplish the above objects, the present invention provides an alkali-activated binder, comprising slag or fly ash; and a sodium-free inorganic alkaline material.

In a preferred embodiment, the sodium-free inorganic alkaline material is used in an amount of 0.5~30 parts by weight based on 100 parts by weight of the slag or fly ash.

In a preferred embodiment, the sodium-free inorganic alkaline material is one or more selected from among calcium hydroxide, barium hydroxide, plaster, a magnesium salt, and magnesium oxide.

In a preferred embodiment, the magnesium salt is any one selected from among magnesium sulfate, magnesium carbonate, magnesium hydroxide, magnesium chloride, magnesium stearate, magnesium metaphosphate, and magnesium lactate.

In a preferred embodiment, the calcium hydroxide is used in an amount of 0.5~15 parts by weight based on 100 parts by weight of the slag or fly ash.

In a preferred embodiment, the barium hydroxide is used in an amount of 0.5~5 parts by weight based on 100 parts by weight of the slag or fly ash.

In a preferred embodiment, the magnesium salt or magnesium oxide is used in an amount of 0.5~20 parts by weight based on 100 parts by weight of the slag or fly ash.

In addition, the present invention provides an alkali-activated mortar, comprising the alkali-activated binder according to an embodiment of the present invention.

In addition, the present invention provides alkali-activated concrete, comprising the alkali-activated binder according to an embodiment of the present invention.

In addition, the present invention provides an alkali-activated concrete product, manufactured from the concrete according to an embodiment of the present invention.

In a preferred embodiment, the concrete product comprises a brick, a block, tile, a drainpipe, curbstone, a concrete pile, prestressed concrete, a concrete panel, a concrete pipe, a manhole, foamed concrete, and a concrete structure.

In addition, the present invention provides an alkali-activated masonry product, comprising the alkali-activated binder according to an embodiment of the present invention; fine aggregate, including one or more selected from among sand, waste foundry sand, stone powder and artificial lightweight aggregate; and water.

In a preferred embodiment, a sodium-containing inorganic material is further comprised, which includes one or more selected from among sodium silicate, sodium sulfate, powdery sodium hydroxide, liquid type water glass, and liquid type sodium hydroxide.

In addition, the present invention provides an alkali-activated wet loess paving material, comprising the alkali-activated binder according to an embodiment of the present invention, loess, coarse aggregate, an additive, fibers, and water, wherein the water is used so that a ratio (W/B) of water (W) to alkali-activated binder (B) is 40~65%.

In a preferred embodiment, the additive is a high-efficiency water-reducing agent and is used in an amount of 0.5~1.5 parts by weight based on 100 parts by weight of the alkali-activated binder.

In a preferred embodiment, the fibers have a high fiber density and are fine so as to have a large number of fibers per unit volume and exhibits superior dispersibility, and are used in an amount of 10~35 parts by weight based on 100 parts by weight of the alkali-activated binder.

In a preferred embodiment, fine aggregate is further comprised, which has a diameter of 5 mm or less and is used to substitute for 20~30 wt % of the weight of the loess.

In a preferred embodiment, a sodium-containing inorganic material is further comprised, which includes one or more selected from among sodium silicate, sodium sulfate, powdery sodium hydroxide, liquid type water glass, and liquid type sodium hydroxide.

In a preferred embodiment, when 50~160 parts by weight of the loess, 80~140 parts by weight of the coarse aggregate, 0.5~1.5 parts by weight of the additive, 10~20 parts by weight of the fibers, and 10~48 parts by weight of the fine aggregate are used based on 100 parts by weight of the alkali-activated binder, a compressive strength of 25~30 MPa is obtained.

In a preferred embodiment, when 100~240 parts by weight of the loess, 170~300 parts by weight of the coarse aggregate, 0.5~1.5 parts by weight of the additive, and 15~35 parts by weight of the fibers are used based on 100 parts by weight of the alkali-activated binder, a compressive strength of 18~24 MPa is obtained.

Advantageous Effects

The present invention has superior effects as described below.

In an alkali-activated binder, and an alkali-activated mortar, concrete, and concrete product, including the same, according to the present invention, an inorganic alkaline material for adjusting the hardening rate of the alkali-activated binder can be used in an amount that is able to maintain compressive strength, thus exhibiting both superior workability and high strength stability.

Also, in an alkali-activated binder, and an alkali-activated mortar, concrete, and concrete product, including the same, according to the present invention, the total amount of $Na_2O$ and $K_2O$ in concrete can be reduced to inhibit the alkali-aggregate reaction in concrete, thereby effectively controlling the alkali-aggregate reaction.

Also, in an alkali-activated binder, and an alkali-activated mortar, concrete, and concrete product, including the same, according to the present invention, rapid sintering caused by a sodium-based material can be controlled, and a Pozzolanic reaction can be activated, thus improving strength and profitability.

Also, in an alkali-activated binder, and an alkali-activated mortar, concrete, and concrete product, including the same, according to the present invention, the production cost can be reduced thanks to the use of an inorganic alkaline material containing magnesium that is comparatively inexpensive.

Also, in an alkali-activated masonry product and a wet loess paving material according to the present invention, profitability and compressive strength of the masonry product can be increased, strength can be more stable, and rapid sintering can be controlled, thus manifesting improved workability and increased productivity, compared to when using conventional alkali-activated binders including only a sodium-containing inorganic alkaline material.

Also, an alkali-activated wet loess paving material according to the present invention is environmentally friendly because of recycling industrial byproducts and adding no cement, can exhibit an initial strength and long-term strength superior to OPC cement and durability and chemical resistance higher than OPC cement, can have a heat of hydration about ½~⅓ of that of OPC cement, and is less affected by the quality of aggregate and thus is not reduced in strength even in the presence of about 20% clay or impurities in the aggregate.

Also, an alkali-activated wet loess paving material according to the present invention can include fibers that are easily dispersed to control surface drying shrinkage cracking and enhance tensile strength and flexural strength.

Also, in an alkali-activated wet loess paving material according to the present invention, part of the total amount of loess can be replaced with fine aggregate having a particle size similar to that of the loess, thus controlling drying shrinkage and increasing compressive strength while maintaining the inherent color of the loess.

Also, in lieu of asphalt or concrete, an alkali-activated wet loess paving material according to the present invention can be applied to places that do not encounter heavy traffic loads, such as walkways, sidewalks, park roads, bicycle roads, etc., and also places requiring high strength to enable passage of heavy vehicles.

MODE FOR INVENTION

Figure 1:
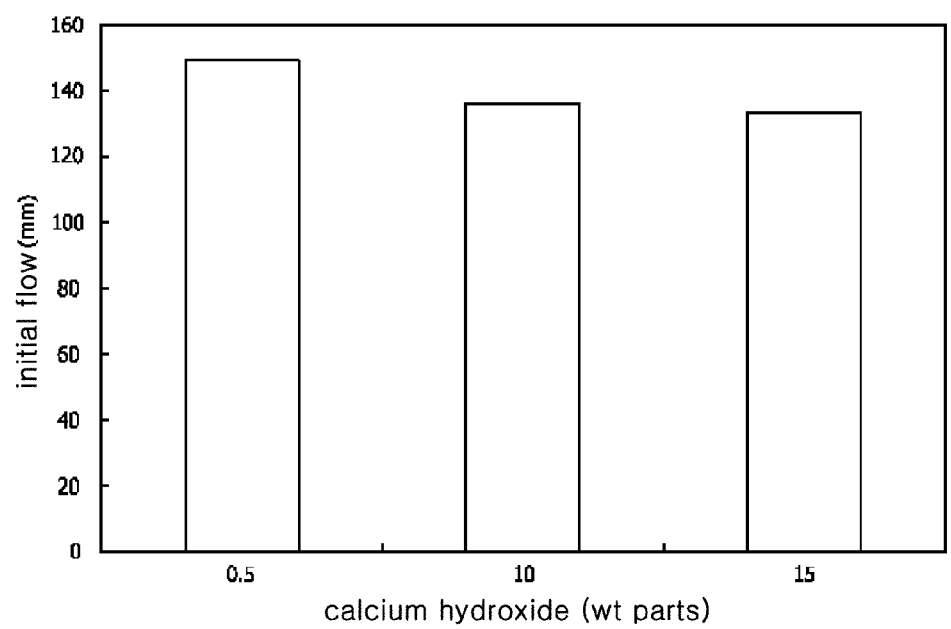
FIGS. 1 and 2 are graphs showing the amount of calcium hydroxide contained in an alkali-activated binder according to an embodiment of the present invention versus the initial flow and the flow loss slope (k), respectively.

The terms used in the present invention include as much as possible general terms which are currently widely used, but, in specific cases, may include optional terms chosen by the applicant, the meanings of which should be interpreted in light of the meanings described or used in the present specification instead of by simply using the names of such terms.

Hereinafter, the technical configuration according to the present invention will be described in detail with reference to the preferred examples and the appended drawings.

However, the present invention is not limited to the examples but may be embodied in other forms. Throughout the specification, the same reference numerals indicate the same elements.

The present invention pertains to an alkali-activated binder which is able to substitute for cement, which includes slag or fly ash and a sodium-free inorganic alkaline material.

Specifically, whereas a conventional alkali-activated binder includes a sodium-containing inorganic alkaline material such as sodium silicate, powdery sodium hydroxide, liquid type water glass and liquid type sodium hydroxide, the alkali-activated binder according to the present invention has no sodium-containing inorganic alkaline material thus exhibiting superior workability and strength stability.

Also, the alkali-activated binder according to the present invention may be manufactured by uniformly mixing a sodium-free inorganic alkaline material with fly ash, meta-kaolin, or slag in a predetermined weight ratio. In particular, in order to maximally decrease the amount of $Na_2O$ contained in mortar manufactured using the alkali-activated binder according to the present invention, no sodium-containing inorganic alkaline material is used, and the use of fly ash or slag the sodium content of which is lower by at least 2 times than that of metal-kaolin which is another industrial byproduct is preferable.

Also, the sodium-free inorganic alkaline material contained in the alkali-activated binder according to the present invention may include one or more selected from among calcium hydroxide, barium hydroxide, plaster, and magnesium-containing inorganic alkaline materials including magnesium salts and magnesium oxide. In the case where only calcium hydroxide is contained, strength and workability may be slightly decreased. Hence, in order to simultaneously increase workability and provide standard strength or better, calcium hydroxide and barium hydroxide or plaster may be used in a predetermined weight ratio, or the magnesium-containing inorganic alkaline material may be added in a predetermined weight proportion. The magnesium salt or magnesium oxide is comparatively inexpensive among sodium-free inorganic alkaline materials. Taking into consideration the standard amount of high strength or better and high workability and profitability, calcium hydroxide and a magnesium salt or magnesium oxide may be used in a predetermined weight ratio.

Also, the magnesium salt contained in the alkali-activated binder according to the present invention includes magnesium sulfate, magnesium carbonate, magnesium hydroxide, magnesium chloride, magnesium stearate, magnesium metaphosphate, and magnesium lactate.

Furthermore, mortar and concrete, including the alkali-activated binder according to the present invention, may include 0.21~0.22 parts by weight of $Na_2O$ based on 100 parts by weight of the alkali-activated binder due to the sodium component contained in a raw material, namely, slag or fly ash.

In addition, the present invention pertains to an alkali-activated masonry product using the alkali-activated binder that is able to substitute for cement, without the use of cement, which includes a raw material including one or more selected from among slag, fly ash, and meta-kaolin, and a sodium-free inorganic alkaline material. Although the conventional alkali-activated binder includes only the sodium-based inorganic material such as sodium silicate, powdery sodium hydroxide, liquid type water glass, and liquid type sodium hydroxide, the present invention uses only the sodium-free inorganic material without the use of the sodium-based inorganic material, or uses the sodium-free inorganic material and the sodium-based inorganic material together, resulting in excellent cement-free alkali-activated masonry products that have a composition effective for controlling the alkali-aggregate reaction and exhibit excellent properties including workability and strength stability. The masonry product used in the present invention designates all products utilized for the masonry structure of buildings, including blocks and bricks.

As in the alkali-activated masonry product according to the present invention, when only the sodium-free inorganic alkaline material is used without the use of the sodium-containing inorganic alkaline material, or when the sodium-containing inorganic alkaline material and the sodium-free inorganic alkaline material are used together, the production cost can be reduced and economic benefits accrue because the sodium-containing inorganic alkaline material is expensive and the sodium-free inorganic alkaline material is inexpensive. In particular, among sodium-containing inorganic alkaline materials, the price of sodium sulfate is much lower than those of other sodium-based inorganic materials, thus increasing profitability.

Specifically, the alkali-activated binder used for the alkali-activated masonry product according to the present invention includes the raw material including one or more selected from among slag, fly ash, and meta-kaolin, and the inorganic alkaline material. The inorganic alkaline material may have the sodium-free inorganic alkaline material including one or more selected from among calcium hydroxide, barium hydroxide, plaster, and magnesium-containing inorganic alkaline materials, with or without the sodium-containing inorganic alkaline material including one or more selected from among sodium silicate, sodium sulfate, powdery sodium hydroxide, liquid type water glass, and liquid type sodium hydroxide.

As such, calcium hydroxide contained in the alkali-activated binder may be used in an amount of 0.5~15 parts by weight based on 100 parts by weight of the raw material, and barium hydroxide may be used in an amount of 0.5~5 parts by weight based on 100 parts by weight of the raw material. The plaster may be used in an amount of 0.5~5 parts by weight based on 100 parts by weight of the raw material. When the sodium-free inorganic material is contained in this weight proportion, strength adapted for masonry products is ensured, and alkali-aggregate reaction can be controlled, and rapid sintering is also controlled, thus increasing workability.

Also, in the case where the alkali-activated binder further includes the sodium-containing inorganic alkaline material, namely, in the case where the sodium-containing inorganic alkaline material and the sodium-free inorganic material are used together, they should be mixed so that the weight ratio of Na or $Na_2O$ contained in the sodium-containing inorganic alkaline material to the raw material falls in the range of 0.005~0.14. This mixing ratio is optimally determined taking into consideration that strength is increased but workability is decreased when the amount of Na or $Na_2O$ is increased in the masonry products. Furthermore, the weight ratio of the sodium-based material to the raw material determines the dynamic properties including fluidity, strength and drying shrinkage of cement-free alkali-activated bricks or blocks according to the present invention.

In the weight ratio of Na or $Na_2O$ contained in the sodium-containing inorganic alkaline material to the raw material in examples which will be described later, the weight of the above sodium-based material was determined by being converted into the weight of $Na_2O$.

Specifically, as the sodium-containing inorganic alkaline material, sodium silicate, sodium sulfate, powdery sodium hydroxide, liquid type water glass, and liquid type sodium hydroxide may have Na or $Na_2O$ corresponding to the above sodium-based material, which is converted into the weight of $Na_2O$ for calculation.

Thus, in the present invention, in the case where the sodium-based material is provided in the form of $Na_2O$, its weight is used unchanged, or in the case where it is provided in another form, the weight thereof is determined by being converted into the weight of $Na_2O$.

In order to obtain the alkali-activated masonry products having improved strength, workability and profitability, it is preferred that the use or not and amount of the sodium-containing inorganic material and the kind and amount of sodium-free inorganic material be determined. When the sodium-free inorganic material is contained in an amount of 0.5~20 parts by weight based on 100 parts by weight of the raw material and simultaneously an appropriate amount of sodium-containing inorganic alkaline material is further contained, masonry products having improved strength, workability and profitability can be manufactured.

In this case, when the raw material is mixed with the inorganic alkaline material (sodium-free inorganic material and sodium-based inorganic alkaline material), the weight of sodium-based inorganic alkaline material is determined so that the weight ratio of the sodium-based material to the raw material may be appropriately adjusted. In the case where the raw material is blast furnace slag, the amounts of sodium-containing inorganic alkaline materials may be adjusted so that the weight ratio of the sodium-based material to the raw material falls within the range of 0.005~0.088.

Also, in the case where the raw material is fly ash or meta-kaolin, the amounts of sodium-containing inorganic alkaline materials may be adjusted so that the weight ratio of the sodium-based material to the raw material falls within the range of 0.088~0.14.

As such, in the case where liquid type sodium hydroxide is contained in the sodium-containing inorganic alkaline materials of the alkali-activated binder, the use of 8~16 M sodium hydroxide solution is preferable.

Used for manufacturing the alkali-activated masonry product according to the present invention, fine aggregate includes one or more selected from among artificial lightweight aggregate, sand, and stone powder, in which the artificial lightweight aggregate preferably has a specific gravity of 1.2 or less.

The sand or stone powder included in the fine aggregate preferably has those having a maximum diameter of 10 mm or less and a specific gravity of 2.5 or more, and more preferably sand has a maximum diameter of 5 mm or less, and stone powder has a maximum diameter of 8 mm or less. The artificial lightweight aggregate included in the fine aggregate preferably has one having inner pores, a weight per unit volume of 300~800 $kg/m^3$, and a maximum diameter of 10 mm or less.

The artificial lightweight aggregate may include fine aggregate which is artificially mass produced from ceramic as a main material. For example, in the case where artificial lightweight aggregate includes one or more selected from among clay, volcanic ash, clinker and fly ash, clay, volcanic ash, clinker and fly ash may be expanded so that inner pores are formed, thereby obtaining the weight per unit volume of artificial lightweight aggregate as above.

Thus, when fine aggregate includes only the artificial lightweight aggregate or a mixture of artificial lightweight aggregate and sand or stone powder at an appropriate ratio, lightweight or ultra-lightweight cement-free alkali-activated masonry products can be manufactured.

In addition, the present invention pertains to a cement-free wet loess paving material, comprising loess and an alkali-activated binder including slag or fly ash and an inorganic alkaline material as a binder that is able to substitute for cement.

Specifically, in the present invention, the alkali-activated binder is used in lieu of cement used for a conventional loess paving material, whereby the loess paving material is less affected by the quality of aggregate, and thus its strength is not decreased even in the presence of about 20% clay or impurities in the aggregate.

Also, the wet loess paving material according to the present invention can solve problems regarding cement toxicity due to the use of cement, $CO_2$ generated upon manufacturing cement, and exhaustion of natural resources attributed to the production of cement, and also poor workability and low profitability resulting from using a dry process of conventional loess paving material can be overcome.

More specifically, the alkali-activated wet loess paving material according to the present invention includes a cement-free alkali-activated binder, loess, coarse aggregate, an additive, fibers, and water.

The alkali-activated binder is manufactured by uniformly mixing a raw material having high quality with a fineness of 29,000 $cm^2/g$ or more and an inorganic alkaline material in a predetermined weight ratio, for example, 0.5~20 parts by weight of the inorganic alkaline material relative to 100 parts by weight of the slag or fly ash. The inorganic alkaline material may include one or more of a sodium-containing inorganic alkaline material and a sodium-free inorganic alkaline material, and the raw material may include fly ash, meta-kaolin or slag, but the use of fly ash or slag having sodium content lower by at least two times than that of meta-kaolin as another industrial byproduct is preferable. The slag may include one or more selected from among blast furnace slag, electric furnace slag, and converter slag, and the kind and mixing ratio of inorganic alkaline materials may vary depending on the end uses of the paving material.

The wet loess paving material according to the present invention includes 50~240 parts by weight of loess based on 100 parts by weight of the alkali-activated binder. The loess preferably includes natural loess having a maximum diameter of not exceeding 5 mm, a specific gravity of 1.9~2.1, and an absorption rate of 10~15%. Hence, useful is loess that satisfies a 5 mm fine aggregate standard particle size distribution curve according to the KS standard.

Also, the alkali-activated wet loess paving material according to the present invention includes aggregate having a size of 13 mm or less in order to control drying shrinkage using aggregate.

General drying shrinkage of concrete is affected by the amount of water used, the amount of binder, the fineness of binder, and the amount of aggregate, and is increased in proportion to increases in the amount of water used, the amount of binder and the fineness of binder and a decrease in the amount of aggregate. Furthermore, large drying shrinkage of loess should be controlled upon manufacturing concrete using loess. In consideration thereof, the wet loess paving material according to the present invention controls drying shrinkage using aggregate. When the aggregate having a size of 13 mm or less is used in an amount of 80~300 parts by weight based on 100 parts by weight of the alkali-activated binder, the total particle size of concrete becomes good and strength is enhanced. Particularly useful as the aggregate is gravel having a maximum diameter of 13 mm or less, a specific gravity of 2.5~2.7, and an absorption rate of 0.5~1%.

Also the alkali-activated wet loess paving material according to the present invention includes fibers in a predetermined weight proportion in order to control surface drying shrinkage cracking and enhance tensile strength and flexural strength.

Specifically, upon road paving, high drying shrinkage cracking is caused and high tensile strength and flexural strength are required. In particular, surface drying shrinkage cracking imposes a poor outer appearance rather than structural problems, and causes distrust in builders and the need for repair of defects. Hence, in the present invention, fibers having high density and being fine to thus have a large number of fibers per unit volume and high dispersibility are used in an amount of 10~35 parts by weight based on 100 parts by weight of the alkali-activated binder. As such, the kind of fibers is not limited so long as it satisfies the above properties, and may include one or more selected from the group consisting of PET fibers, cellulose fibers, PVA fibers, nylon fibers, and polyolefinic fibers.

Also, the alkali-activated wet loess paving material according to the present invention includes a dry additive in order to ensure the desired slump in terms of compressive strength and workability.

The additive may include any additive known to ensure slump. Particularly useful is a polycarbonic acid-based high-efficiency water-reducing agent having good quality.

Also, the alkali-activated wet loess paving material according to the present invention includes water so that the ratio (W/B) of water (W) to alkali-activated binder (B) is 40~65% to solve problems of a dry process of conventional loess paving material in order to provide an economical and environmentally friendly wet process of wet loess paving material that enables wet construction in the range of slump of 150~200 mm.

The water does not contain harmful materials which negatively affect the quality of oil, acid, alkali, etc., and drinking water is typically good but underground water, industrial water, river water or the like may be used so long as it does not adversely affect the quality of concrete.

In some cases, the alkali-activated wet loess paving material according to the present invention may include fine aggregate having a particle size similar to that of the loess in order to control drying shrinkage and increase compressive strength while maintaining the inherent color of loess. In this case, the fine aggregate may have a diameter of 5 mm or less, and may be used to substitute for 20~30 wt % of the weight of loess.

Specifically, the maximum diameter of loess is about 5 mm which is similar to that of fine aggregate, but the large absorption rate of loess causes problems including drying shrinkage cracking, necessary slump reduction, and necessary compressive strength reduction. Hence, in the present invention, fine aggregate having a particle size similar to that of loess is used as part of the total amount of loess, thereby controlling drying shrinkage and increasing compressive strength while maintaining the inherent color of loess.

Below, "GGBS" used in the present invention is obtained by grinding blast furnace slag to powder having a predetermined size, and indicates "Ground Granulated Blast Furnace Slag".

Example 1

100 parts by weight of GGBS and 0.5 parts by weight of calcium hydroxide powder were uniformly mixed, thus manufacturing an alkali-activated binder 1.

Example 2

100 parts by weight of GGBS and 10 parts by weight of calcium hydroxide powder were uniformly mixed, thus manufacturing an alkali-activated binder 2.

Example 3

100 parts by weight of GGBS and 15 parts by weight of calcium hydroxide powder were uniformly mixed, thus manufacturing an alkali-activated binder 3.

Example 4

100 parts by weight of GGBS and 0.5 parts by weight of barium hydroxide powder were uniformly mixed, thus manufacturing an alkali-activated binder 4.

Example 5

100 parts by weight of GGBS and 2.5 parts by weight of barium hydroxide powder were uniformly mixed, thus manufacturing an alkali-activated binder 5.

Example 6

100 parts by weight of GGBS and 5 parts by weight of barium hydroxide powder were uniformly mixed, thus manufacturing an alkali-activated binder 6.

Example 7

100 parts by weight of GGBS, 0.5 parts by weight of calcium hydroxide powder, and 1 part by weight of barium hydroxide powder were uniformly mixed, thus manufacturing an alkali-activated binder 7.

Example 8

100 parts by weight of GGBS, 0.5 parts by weight of calcium hydroxide powder, and 5 parts by weight of barium hydroxide powder were uniformly mixed, thus manufacturing an alkali-activated binder 8.

Example 9

100 parts by weight of GGBS, 15 parts by weight of calcium hydroxide powder, and 0.5 parts by weight of barium hydroxide powder were uniformly mixed, thus manufacturing an alkali-activated binder 9.

Example 10

100 parts by weight of GGBS, 15 parts by weight of calcium hydroxide powder, and 5 parts by weight of barium hydroxide powder were uniformly mixed, thus manufacturing an alkali-activated binder 10.

Example 11

100 parts by weight of GGBS, 10 parts by weight of calcium hydroxide powder, and 0.5 parts by weight of plaster powder were uniformly mixed, thus manufacturing an alkali-activated binder 11.

Example 12

100 parts by weight of GGBS, 5 parts by weight of barium hydroxide powder, and 5 parts by weight of plaster powder were uniformly mixed, thus manufacturing an alkali-activated binder 12.

Example 13

100 parts by weight of GGBS, 10 parts by weight of calcium hydroxide powder, 5 parts by weight of barium hydroxide powder, and 2.5 parts by weight of plaster powder were uniformly mixed, thus manufacturing an alkali-activated binder 13.

Example 14

Alkali-activated mortars 1 to 13 were manufactured under conditions in which the ratio (W/B) of water to alkali-activated binders 1 to 13 of Examples 1 to 13 was 50%, and the weight ratio (S/B) of sand to raw material was 3.0, and the maximum diameter of aggregate was 5 mm or less.

Test Example 1

The alkali-activated mortars 1 to 3 were tested for the initial flow and the flow loss slope (k) depending on the amount of calcium hydroxide contained in the mortar. The results are graphed in FIGS. 1 and 2.

Test Example 2

Figure 3:
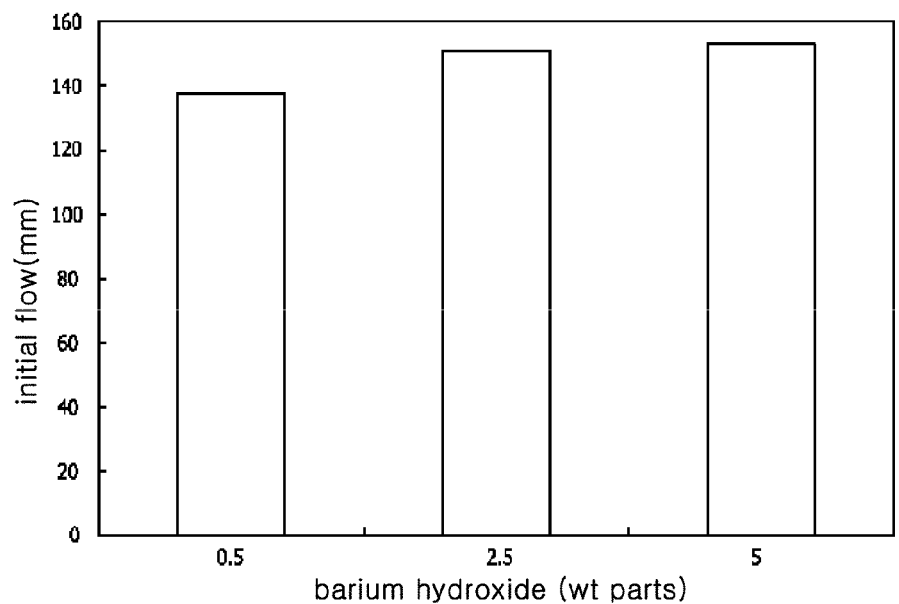
FIGS. 3 and 4 are graphs showing the amount of barium hydroxide contained in an alkali-activated binder according to another embodiment of the present invention versus the initial flow and the flow loss slope (k), respectively.

The alkali-activated mortars 4 to 6 were tested for the initial flow and the flow loss slope (k) depending on the amount of barium hydroxide contained in the mortar. The results are graphed in FIGS. 3 and 4.

Test Example 3

The alkali-activated mortars 7 to 10 were tested for the initial flow and the flow loss slope (k) depending on the amounts of calcium hydroxide and barium hydroxide contained in the mortar. The results are graphed in FIGS. 5 and 6.

Test Example 4

The alkali-activated mortars 11 to 13 were tested for the initial flow and the flow loss slope (k) depending on the amounts of calcium hydroxide, barium hydroxide and plaster contained in the mortar. The results are graphed in FIGS. 7 and 8.

Figure 4:
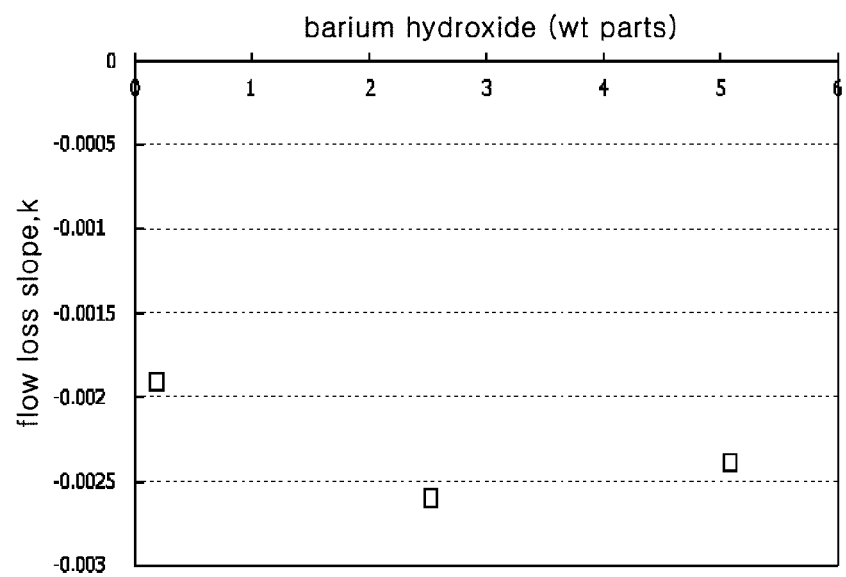

With reference to FIGS. 1 to 8 showing the results of Test Examples 1 to 4, the initial flow was increased in proportion to an increase in the amount of barium hydroxide contained in the alkali-activated binder regardless of the use of calcium hydroxide (FIG. 3), but as shown in FIG. 4, the flow loss was decreased in proportion to an increase in the amount of barium hydroxide.

Specifically, as the amount of barium hydroxide contained in the alkali-activated binder increases, the hardening rate of mortar including the alkali-activated binder is effectively delayed. Consequently, when the amount of barium hydroxide is adjusted, the hardening rate of mortar including the alkali-activated binder can be controlled, thus improving workability.

Figure 2:
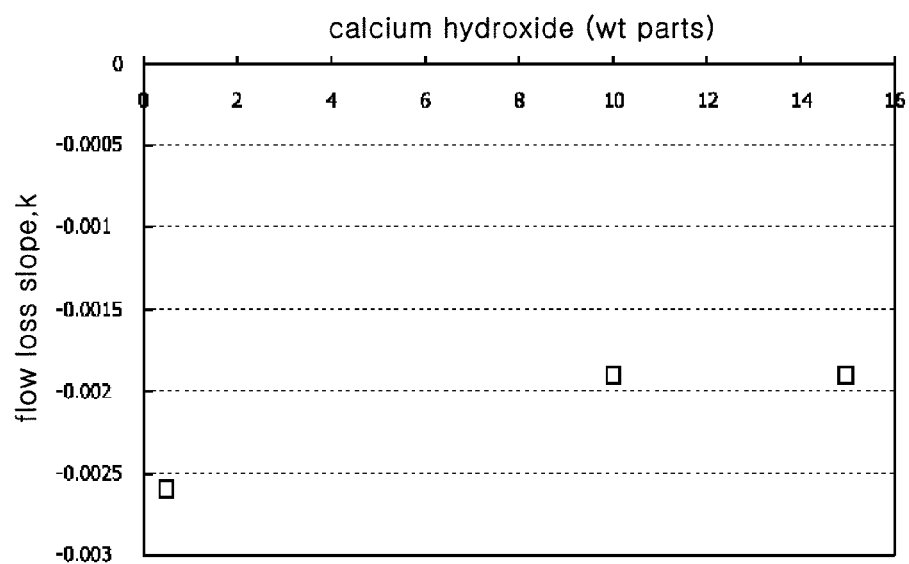

Also, as seen in FIGS. 1 and 2, the initial flow was decreased in proportion to an increase in the amount of calcium hydroxide contained in the alkali-activated binder, regardless of the use of barium hydroxide. However, an increase in the amount of calcium hydroxide was effective for controlling the flow loss.

Consequently, calcium hydroxide contained in the alkali-activated binder can delay initial hardening of the alkali-activated binder.

Figure 5:
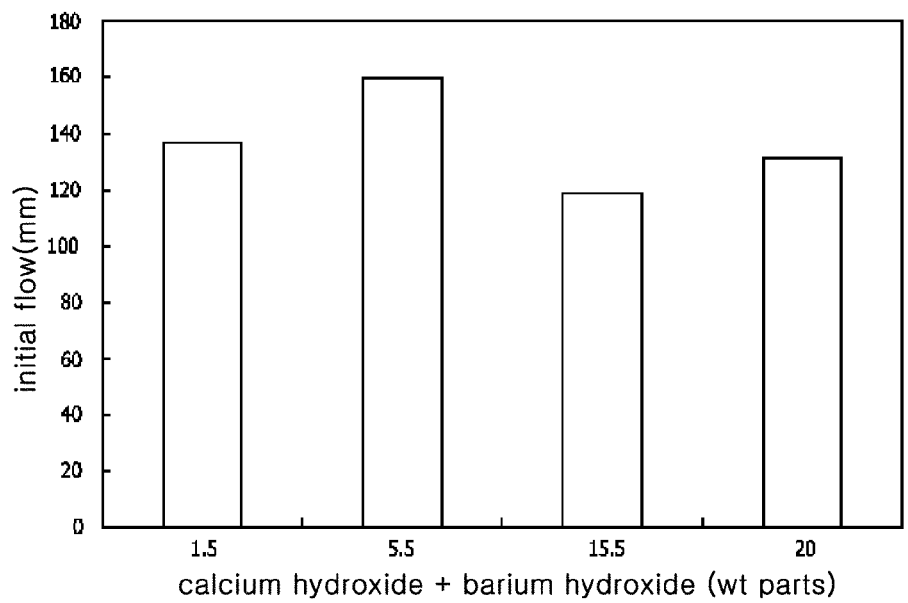
FIGS. 5 and 6 are graphs showing the amounts of calcium hydroxide and barium hydroxide contained in an alkali-activated binder according to another embodiment of the present invention versus the initial flow and the flow loss slope (k), respectively.
Figure 6:
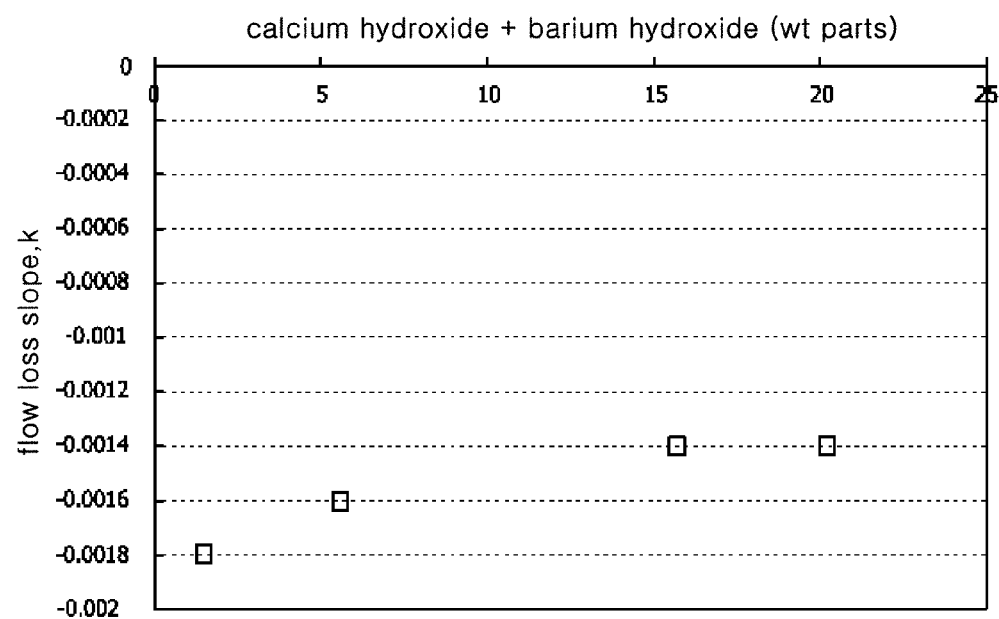

Thus, as shown in FIGS. 5 and 6, the amounts of calcium hydroxide and barium hydroxide contained in the alkali-activated binder are determined in terms of fluidity in consideration of initial flow and flow loss, thereby ensuring optimal workability.

Figure 7:
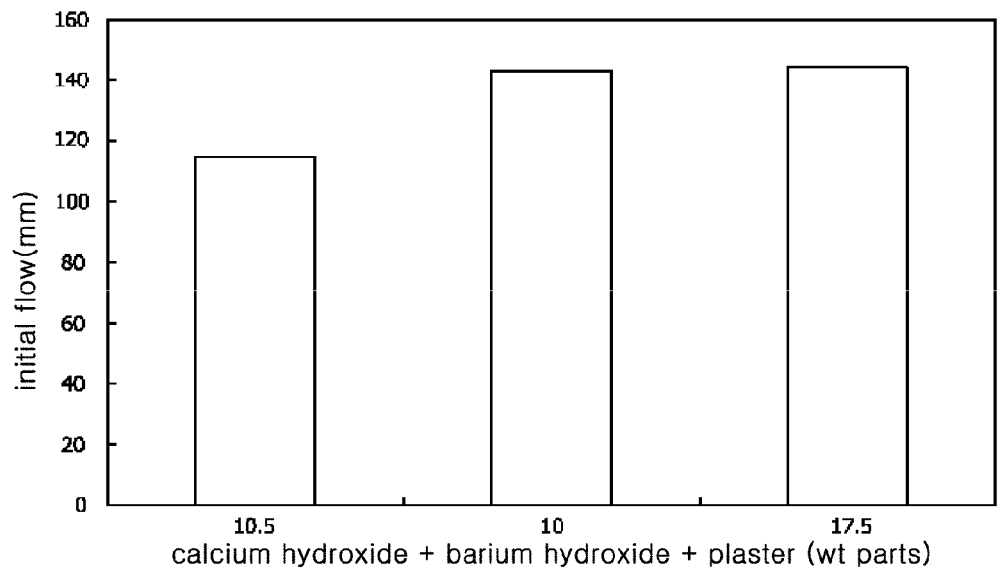
FIGS. 7 and 8 are graphs showing the amounts of calcium hydroxide, barium hydroxide and plaster contained in an alkali-activated binder according to another embodiment of the present invention versus the initial flow and the flow loss slope (k), respectively.
Figure 8:
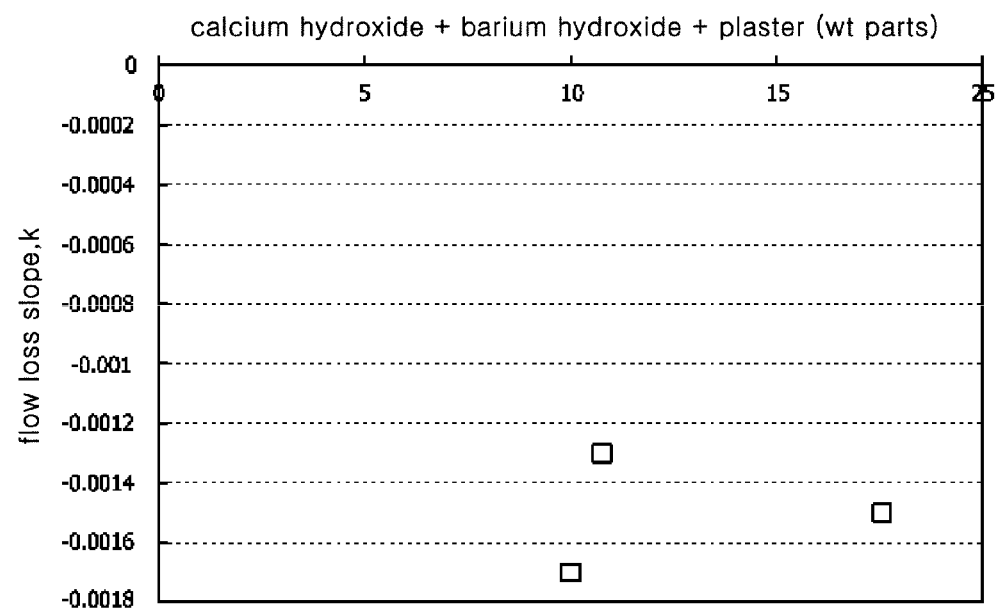

With reference to FIGS. 7 and 8, when the plaster is contained in the alkali-activated binder, the amount of plaster can also be seen to affect the initial flow and the flow loss. However, even if the amount of plaster is increased, it has no effect on them in the presence of barium hydroxide in a predetermined weight or more.

Test Example 5

Figure 9:
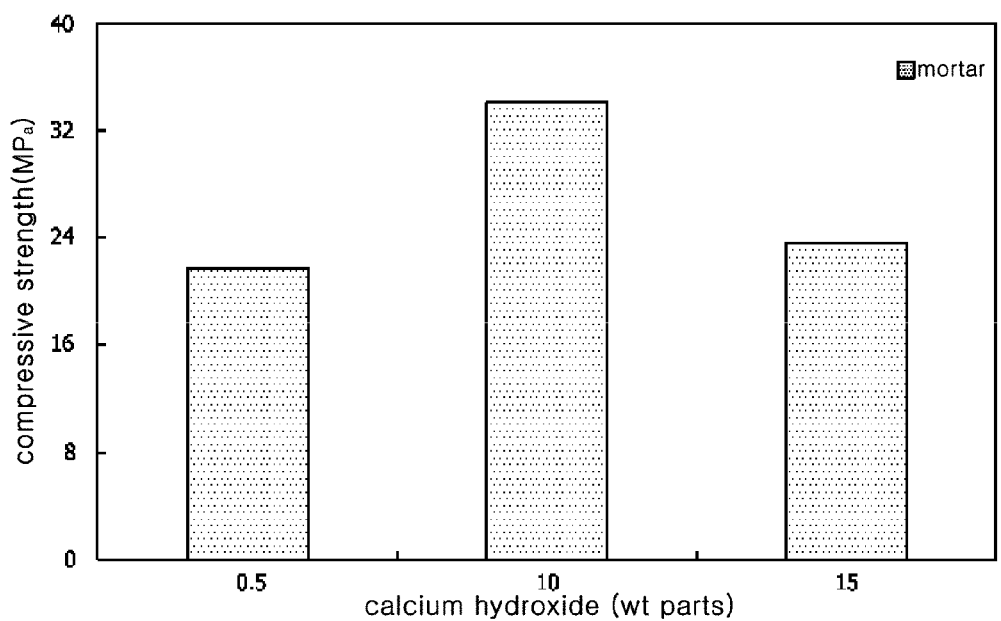
FIG. 9 is a graph showing the amount of calcium hydroxide contained in the alkali-activated binder according to an embodiment of the present invention versus the 28-day compressive strength.

The alkali-activated mortars 1 to 3 were tested for the 28-day compressive strength depending on the amount of calcium hydroxide contained in the mortar. The results are graphed in FIG. 9.

Test Example 6

Figure 10:
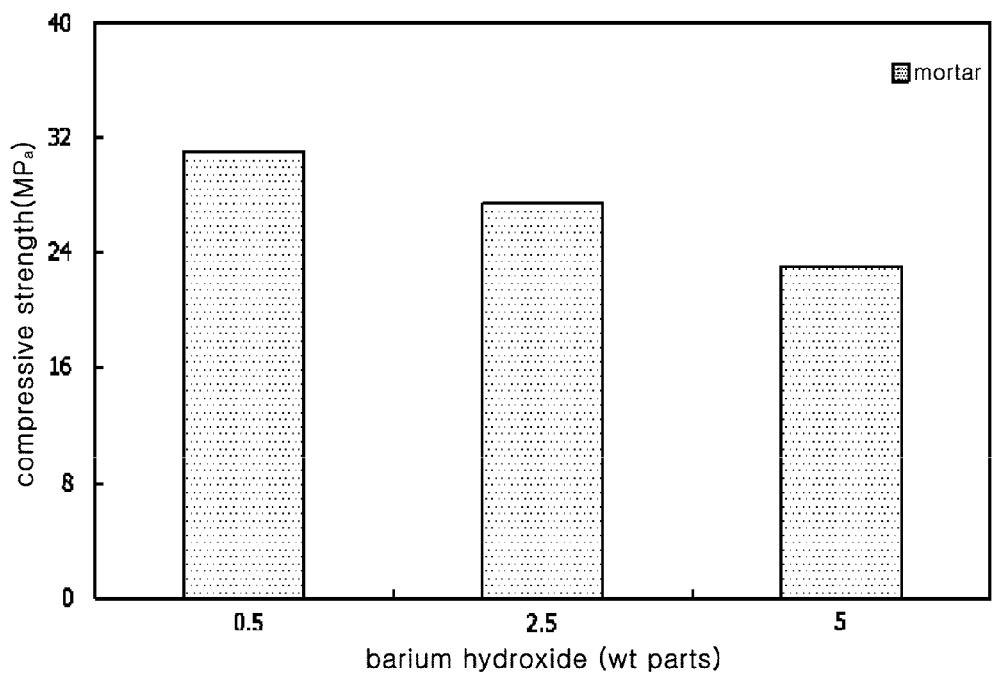
FIG. 10 is a graph showing the amount of barium hydroxide contained in the alkali-activated binder according to another embodiment of the present invention versus the 28-day compressive strength.

The alkali-activated mortars 4 to 6 were tested for the 28-day compressive strength depending on the amount of barium hydroxide contained in the mortar. The results are graphed in FIG. 10.

Test Example 7

Figure 11:
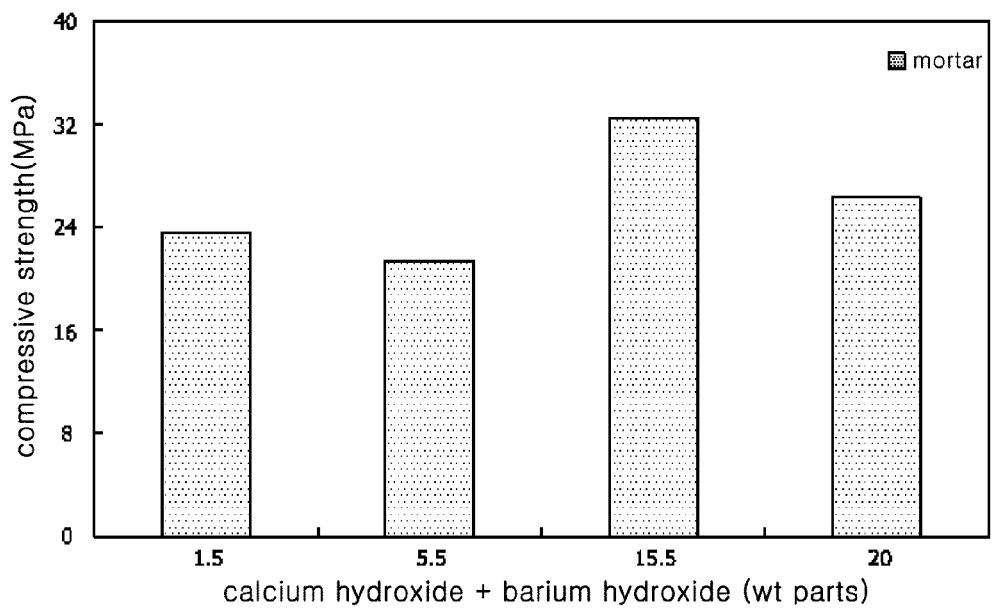
FIG. 11 is a graph showing the amounts of calcium hydroxide and barium hydroxide contained in the alkali-activated binder according to another embodiment of the present invention versus the 28-day compressive strength.

The alkali-activated mortars 7 to 10 were tested for the 28-day compressive strength depending on the amounts of calcium hydroxide and barium hydroxide contained in the mortar. The results are graphed in FIG. 11.

Test Example 8

Figure 12:
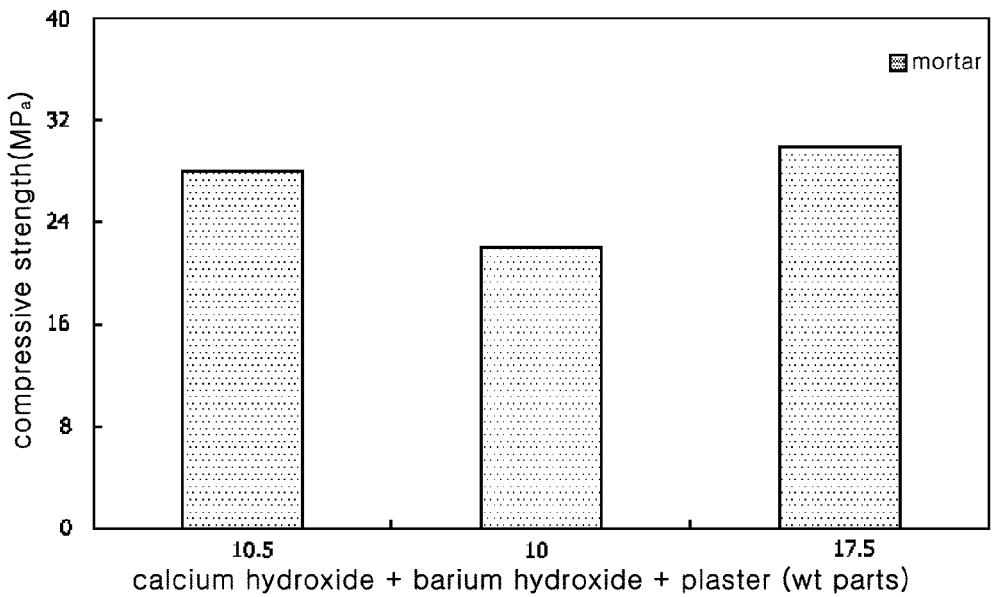
FIG. 12 is a graph showing the amounts of calcium hydroxide, barium hydroxide and plaster contained in the alkali-activated binder according to another embodiment of the present invention versus the 28-day compressive strength.

The alkali-activated mortars 11 to 13 were tested for the 28-day compressive strength depending on the amounts of calcium hydroxide, barium hydroxide and plaster contained in the mortar. The results are graphed in FIG. 12.

With reference to the graphs of FIGS. 9 to 12 showing the 28-day compressive strength depending on the amount of barium hydroxide, calcium hydroxide and/or plaster contained in the mortar, when the amount of barium hydroxide contained in the alkali-activated binder was 2.5 parts by weight or less, the 28-day compressive strength was increased in proportion to an increase in the amount of barium hydroxide. However, when the amount of barium hydroxide exceeded 2.5 parts by weight, the 28-day compressive strength was decreased in proportion to an increase in the amount of barium hydroxide. Thus, the amount of barium hydroxide contained in the alkali-activated binder can be set to 0.5~5 parts by weight.

As shown in the drawings, depending on the use or not of barium hydroxide under conditions of the amount of calcium hydroxide contained in the alkali-activated binder being constant, the 28-day compressive strength was decreased in proportion to an increase in the amount of added barium hydroxide. Even when the amount of calcium hydroxide used alone or in combination with barium hydroxide exceeded 10 parts by weight, a significant increase in compressive strength depending on the increase in amount of calcium hydroxide was not observed. Thus, the case where calcium hydroxide is included in the alkali-activated binder can stably exhibit the strength.

Although not seen in the examples, the above test results were also similar in cases of alkali-activated concrete including the alkali-activated binders 1 to 13.

As in the mortar including the alkali-activated binder, the concrete includes 0.21~0.22 parts by weight of $Na_2O$ based on 100 parts by weight of the alkali-activated binder.

Example 15

100 parts by weight of GGBS and 10 parts by weight of magnesium chloride powder were uniformly mixed, thus manufacturing an alkali-activated binder 14.

Example 16

100 parts by weight of GGBS and 10 parts by weight of magnesium nitrate powder were uniformly mixed, thus manufacturing an alkali-activated binder 15.

Example 17

100 parts by weight of GGBS and 10 parts by weight of magnesium silicate powder were uniformly mixed, thus manufacturing an alkali-activated binder 16.

Example 18

100 parts by weight of GGBS and 10 parts by weight of magnesium oxide powder were uniformly mixed, thus manufacturing an alkali-activated binder 17.

Example 19

100 parts by weight of GGBS, 10 parts by weight of calcium hydroxide powder, and 0.55 parts by weight of magnesium chloride powder were uniformly mixed, thus manufacturing an alkali-activated binder 18.

Examples 20 to 22

Alkali-activated binders 19 to 21 were manufactured in the same manner as in Example 5, with the exception that magnesium chloride powder was used in amounts of 5.7 parts by weight, 12 parts by weight, and 19 parts by weight, respectively.

Example 23

100 parts by weight of GGBS, 10 parts by weight of calcium hydroxide powder, and 0.5 parts by weight of magnesium nitrate powder were uniformly mixed, thus manufacturing an alkali-activated binder 22.

Examples 24 to 27

Alkali-activated binders 23 to 26 were manufactured in the same manner as in Example 23, with the exception that magnesium nitrate powder was used in amounts of 5 parts by weight, 7 parts by weight, 10 parts by weight, and 15 parts by weight, respectively.

Example 28

100 parts by weight of GGBS, 10 parts by weight of calcium hydroxide powder, and 0.5 parts by weight of magnesium silicate powder were uniformly mixed, thus manufacturing an alkali-activated binder 27.

Examples 29 to 31

Alkali-activated binders 28 to 30 were manufactured in the same manner as in Example 28, with the exception that magnesium silicate powder was used in amounts of 5 parts by weight, 10 parts by weight, and 15 parts by weight, respectively.

Example 32

100 parts by weight of GGBS, 10 parts by weight of calcium hydroxide powder, and 0.5 parts by weight of magnesium oxide powder were uniformly mixed, thus manufacturing an alkali-activated binder 31.

Examples 33 to 36

Alkali-activated binders 32 to 35 were manufactured in the same manner as in Example 32, with the exception that magnesium oxide powder was used in amounts of 2 parts by weight, 7 parts by weight, 10 parts by weight, and 15 parts by weight, respectively.

Example 37

Alkali-activated mortars 14 to 35 were manufactured under conditions in which the ratio (W/B) of water to alkali-activated binders 14 to 35 of Examples 15 to 36 was 50%, and the weight ratio (S/B) of sand to raw material was 3.0, and the maximum diameter of aggregate was 5 mm or less.

Test Example 9

The alkali-activated mortars 14 to 17 were tested for the 28-day compressive strength depending on the kind of magnesium-containing inorganic alkaline material contained in the mortar. The results are graphed in FIG. 13.

Figure 13:
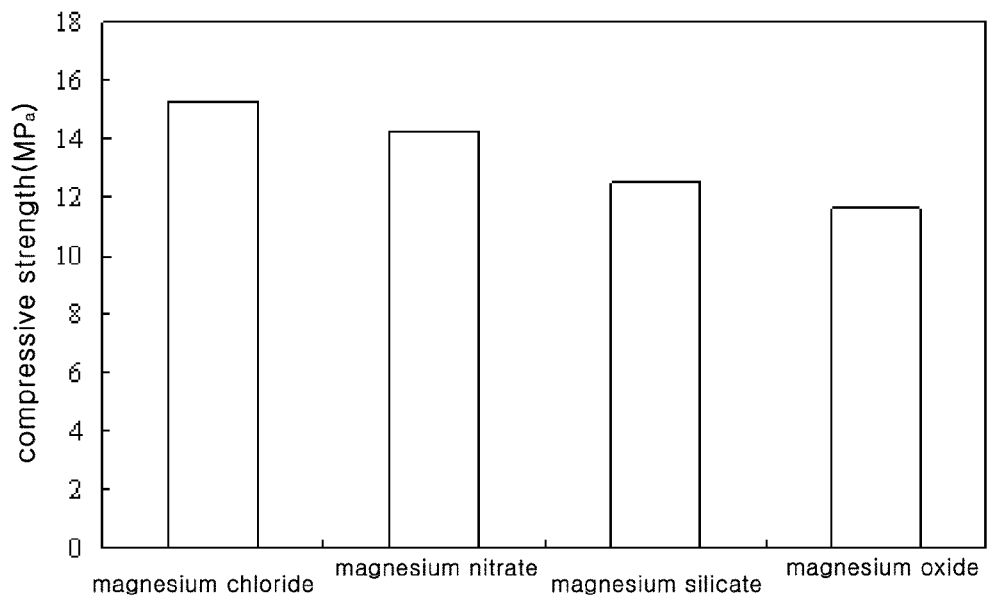
FIG. 13 is a graph showing the 28-day compressive strength depending on the kind of magnesium-containing inorganic alkaline material contained in the alkali-activated binder according to another embodiment of the present invention.

With reference to FIG. 13 showing the results of Test Example 9, even when different kinds of magnesium-containing inorganic alkaline materials were used, the resultant strength was adapted for part or all of standard strength (according to the KS standard) required for concrete products, or the strength was ensured to be higher than that. As some illustrations of strength according to the KS standard, 8 MPa is for bricks, 4 MPa is for blocks, and 21 MPa is for revetment blocks, and the concrete structure has no KS standard but 21 MPa or more is typically required therefor.

Test Example 10

The alkali-activated mortars 18 to 21 were tested for the initial flow and the 28-day compressive strength depending on the amount of magnesium chloride contained in the mortar. The results are graphed in FIGS. 14 and 15.

Figure 14:
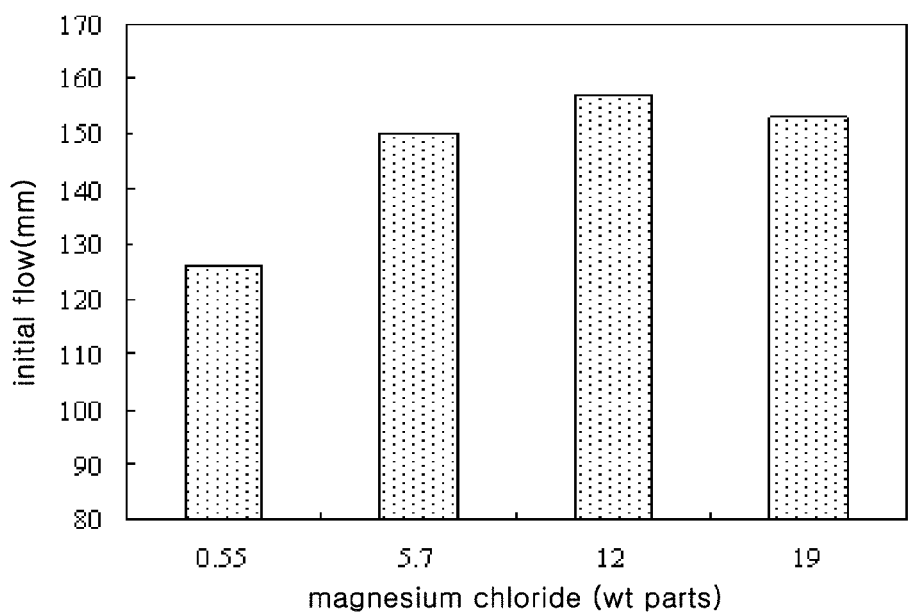
FIGS. 14 and 15 are graphs showing the initial flow and the 28-day compressive strength depending on changes in the amount of magnesium chloride when the alkali-activated binder according to another embodiment of the present invention includes magnesium chloride and calcium hydroxide.
Figure 15:
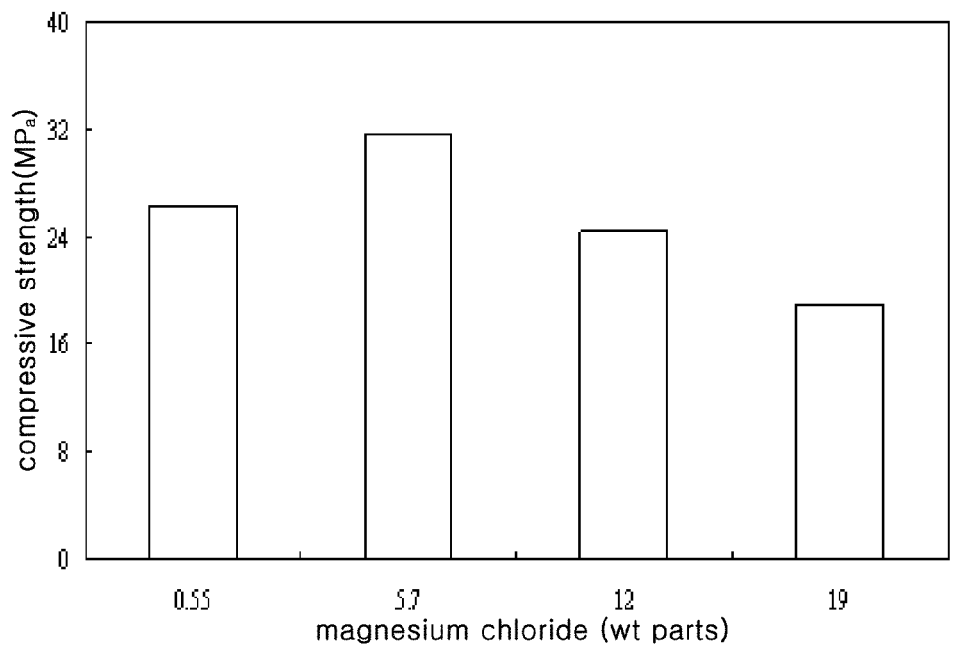

As seen in FIGS. 14 and 15 showing the results of Test Example 10, depending on the amount of magnesium chloride under conditions of the amount of calcium hydroxide contained in the alkali-activated binder being constant, the initial flow was increased up to 12 parts by weight and then gradually decreased, and the compressive strength was increased up to 5.7 parts by weight and then gradually decreased from exceeding 5.7 parts by weight.

Thus, the amount of magnesium chloride contained in the alkali-activated binder can be set to 0.5~20 parts by weight, and preferably 0.55~12 parts by weight in consideration of workability, profitability, and strength.

Test Example 11

The alkali-activated mortars 22 to 26 were tested for the initial flow and the 28-day compressive strength depending on the amount of magnesium nitrate contained in the mortar. The results are graphed in FIGS. 16 and 17.

Figure 16:
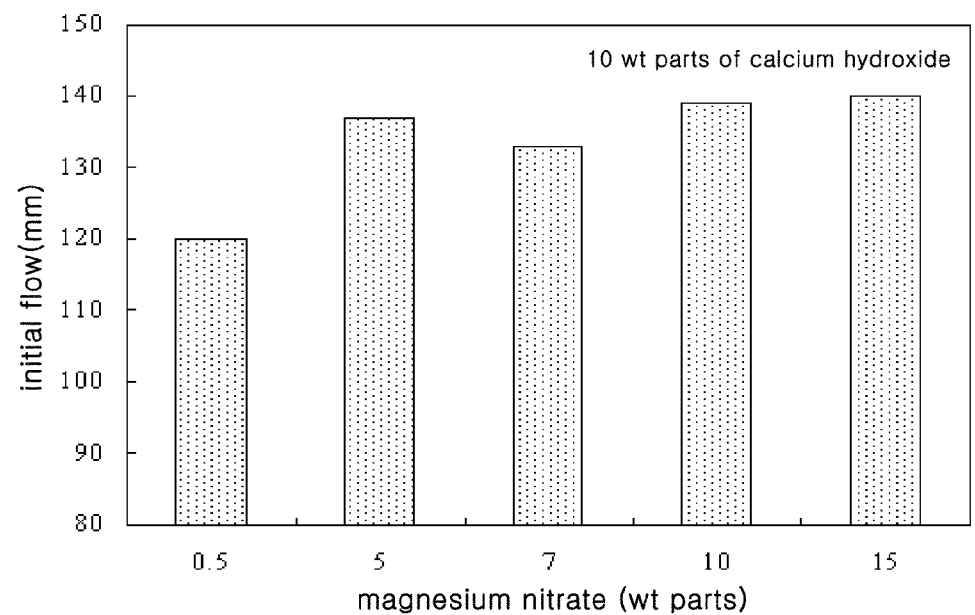
FIGS. 16 and 17 are graphs showing the initial flow and the 28-day compressive strength depending on changes in the amount of magnesium nitrate when the alkali-activated binder according to another embodiment of the present invention includes magnesium nitrate and calcium hydroxide.
Figure 17:
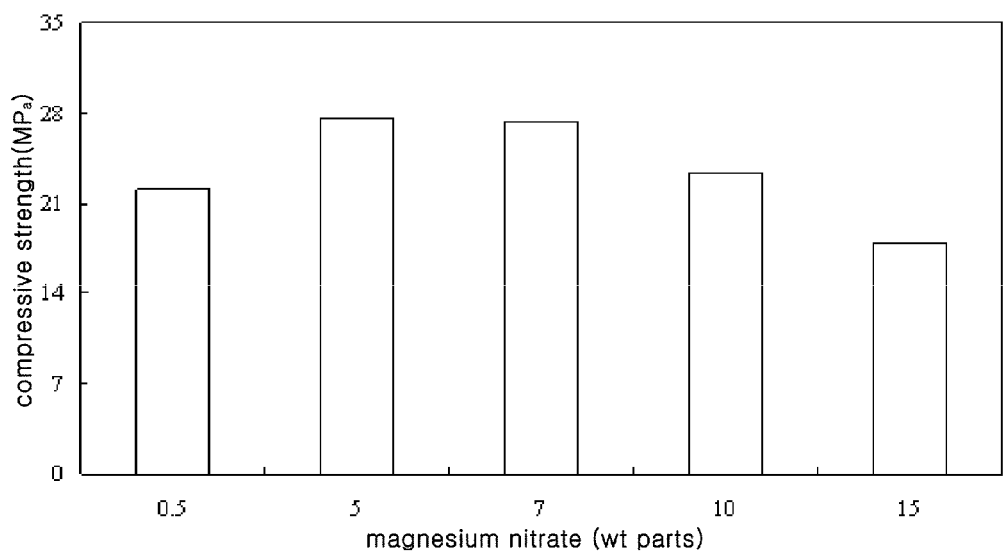

As seen in FIGS. 16 and 17 showing the results of Test Example 11, depending on the amount of magnesium nitrate under conditions of the amount of calcium hydroxide contained in the alkali-activated binder being constant, the initial flow was almost increased in proportion to an increase in the amount thereof, and the compressive strength was changed in the form of an arc in the range from 0.5 parts by weight to 10 parts by weight, and was decreased more when exceeding 10 parts by weight than when using 0.5 parts by weight.

Thus, the amount of magnesium nitrate contained in the alkali-activated binder can be set to 0.5~20 parts by weight, and preferably 10 parts by weight or less in consideration of workability, profitability, and strength.

Test Example 12

The alkali-activated mortars 27 to 30 were tested for the initial flow and the 28-day compressive strength depending on the amount of magnesium silicate contained in the mortar. The results are graphed in FIGS. 18 and 19.

Figure 18:
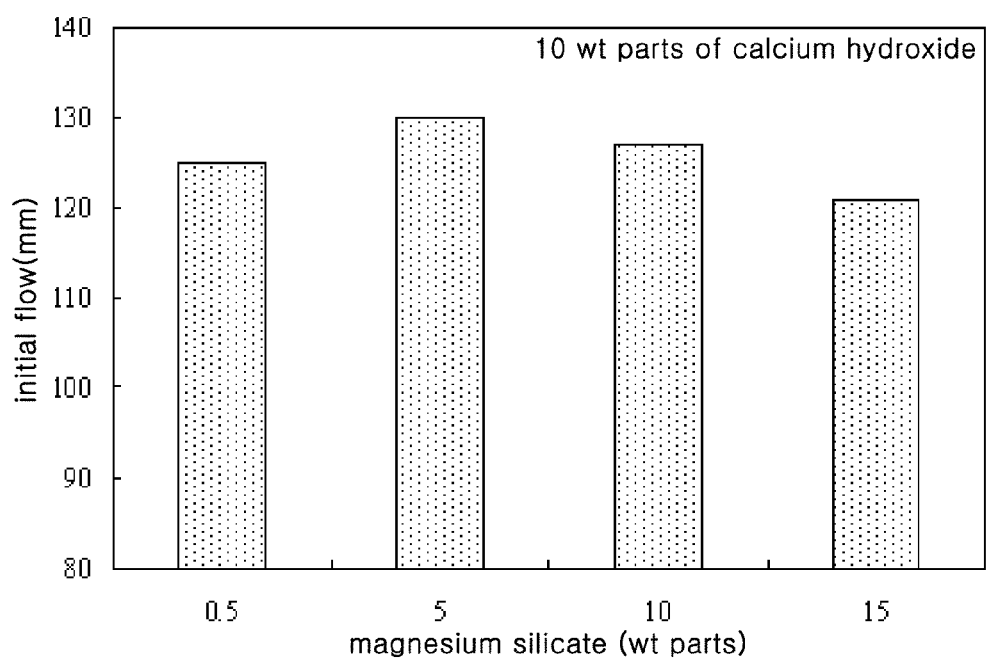
FIGS. 18 and 19 are graphs showing the initial flow and the 28-day compressive strength depending on changes in the amount of magnesium silicate when the alkali-activated binder according to another embodiment of the present invention includes magnesium silicate and calcium hydroxide.
Figure 19:
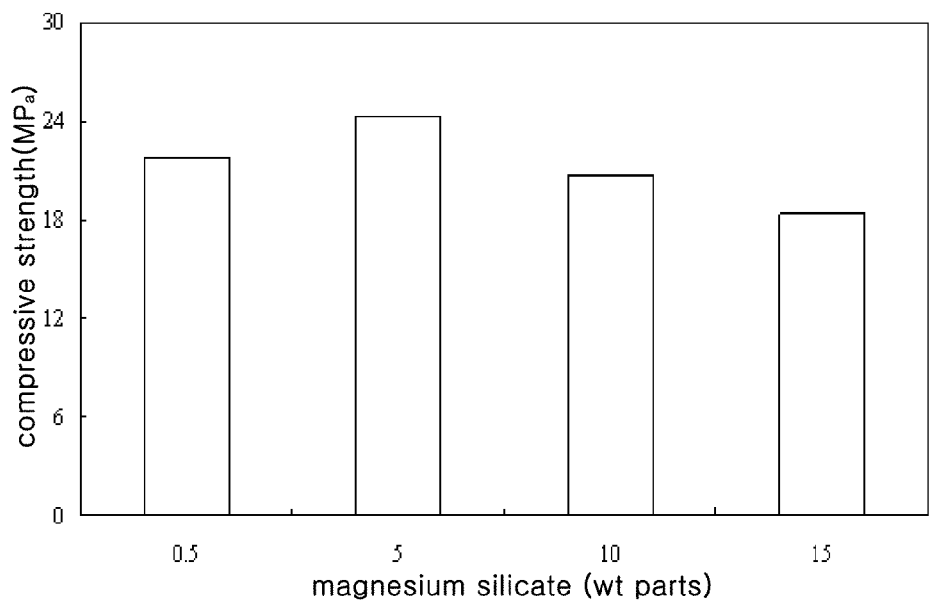

As seen in FIGS. 18 and 19 showing the results of Test Example 12, depending on the amount of magnesium silicate under conditions of the amount of calcium hydroxide contained in the alkali-activated binder being constant, the initial flow was increased up to 5 parts by weight and then decreased, and the compressive strength was also increased up to 5 parts by weight and then gradually decreased.

Thus, the amount of magnesium silicate contained in the alkali-activated binder can be set to 0.5~20 parts by weight, and preferably 10 parts by weight or less in consideration of workability, profitability, and strength.

Test Example 13

The alkali-activated mortars 31 to 35 were tested for the initial flow and the 28-day compressive strength depending on the amount of magnesium oxide contained in the mortar. The results are graphed in FIGS. 20 and 21.

Figure 20:
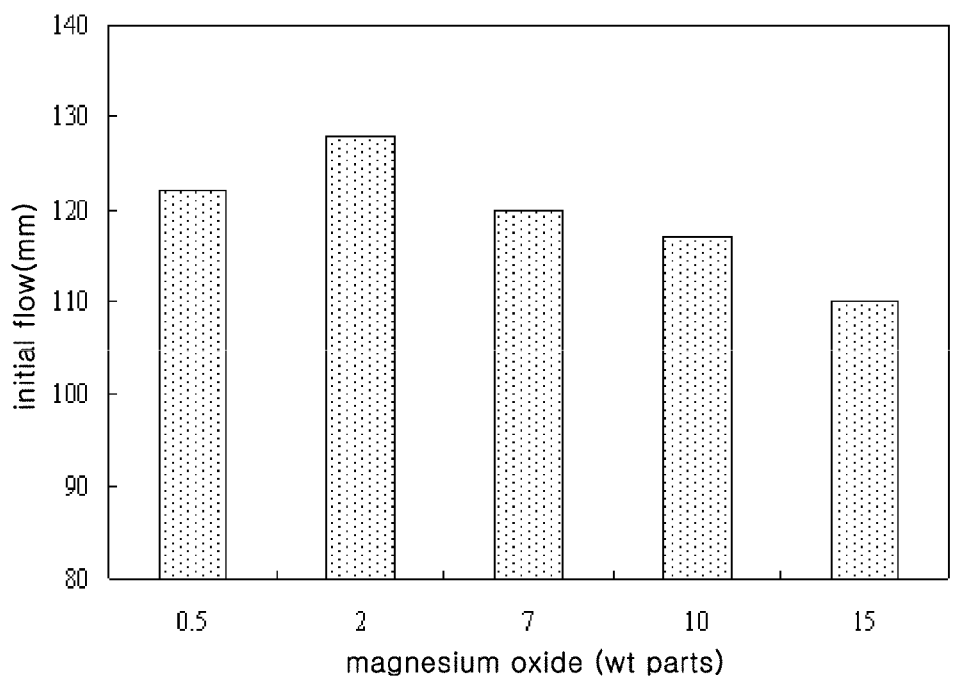
FIGS. 20 and 21 are graphs showing the initial flow and the 28-day compressive strength depending on changes in the amount of magnesium oxide when the alkali-activated binder according to another embodiment of the present invention includes magnesium oxide and calcium hydroxide.
Figure 21:
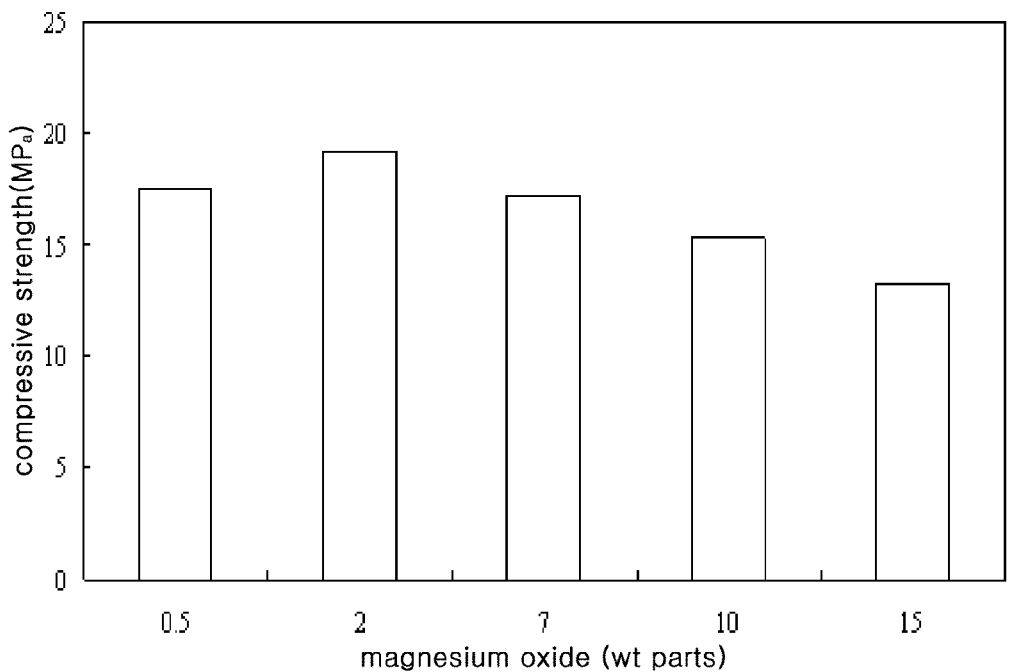

As seen in FIGS. 20 and 21 showing the results of Test Example 13, depending on the amount of magnesium oxide under conditions of the amount of calcium hydroxide contained in the alkali-activated binder being constant, the initial flow was increased up to 2 parts by weight and then decreased, and the compressive strength was also increased up to 2 parts by weight and then gradually decreased.

Thus, the amount of magnesium oxide contained in the alkali-activated binder can be set to 0.5~20 parts by weight, and preferably 10 parts by weight or less in consideration of workability, profitability, and strength.

Although not shown in the examples, the above test results were also similar in cases of alkali-activated concrete including the alkali-activated binders 14 to 35.

Meanwhile, using the concrete including the alkali-activated binder according to the present invention, alkali-activated concrete secondary products including lightweight bricks, bricks, interlocking blocks, revetment blocks, fishway blocks, drainpipes, curbstone, and concrete pipes can be manufactured, and also alkali-activated concrete structural members can be manufactured. When the concrete products including concrete secondary products and concrete structural members are manufactured from the concrete including the alkali-activated binder according to the present invention in this way, they are not influenced by the restriction of the total amount of alkali in concrete, and thus the production thereof becomes very easy. Furthermore, alkali-aggregate reaction can be inhibited, and strength can be easily exhibited and maintained.

Example 38

In order to manufacture bricks among masonry products, the components in amounts shown in Table 1 below were prepared, in which the alkali-activated binder included GGBS and calcium hydroxide, and calcium hydroxide was used in an amount of about 5 parts by weight based on 100 parts by weight of a raw material. The alkali-activated masonry product 1 was manufactured by uniformly stirring the alkali-activated binder (including GGBS and calcium hydroxide), fine aggregate, and water in amounts shown in Table 1, followed by performing vibration compression using a known process so that they were tightly compacted thus forming a brick having a desired shape which was then aged under steam at 65° C. or less. The manufactured alkali-activated masonry product 1 was a brick having a length of 190±2 mm, a width of 90±2 mm, and a height of 57±2 mm.

TABLE 1

| Weight per Unit Volume (kgf/m³) | | | | | |
|---|---|---|---|---|---|
| GGBS | Sodium Silicate | Water Glass | Calcium Hydroxide | Water | Fine Aggregate |
| 212 | — | — | 11 | 181 | 1836 |

Example 39

An alkali-activated masonry product 2 was manufactured in the same manner and the same dimension as in Example 38, with the exception that the mixing ratio shown in Table 2 below was used, and the alkali-activated binder used for the alkali-activated masonry product 2 included GGBS and calcium hydroxide, in which calcium hydroxide was used in an amount of about 10 parts by weight based on 100 parts by weight of the raw material.

TABLE 2

| Weight per Unit Volume (kgf/m³) | | | | | |
|---|---|---|---|---|---|
| GGBS | Sodium Silicate | Water Glass | Calcium Hydroxide | Water | Fine Aggregate |
| 213 | — | — | 21 | 154 | 1896 |

Example 40

An alkali-activated masonry product 3 was manufactured in the same manner and the same dimension as in Example 38, with the exception that the mixing ratio shown in Table 3 below was used, and the alkali-activated binder used for the alkali-activated masonry product 3 included GGBS, calcium hydroxide and sodium silicate, in which calcium hydroxide was used in an amount of about 5 parts by weight based on 100 parts by weight of the raw material and the weight ratio of Na or $Na_2O$ contained in the sodium-containing inorganic alkaline material, namely sodium silicate to the raw material was calculated to be 0.015.

TABLE 3

| Weight per Unit Volume (kgf/m³) | | | | | |
|---|---|---|---|---|---|
| GGBS | Sodium Silicate | Water Glass | Calcium Hydroxide | Water | Fine Aggregate |
| 206 | 7 | — | 10 | 158 | 1834 |

Example 41

An alkali-activated masonry product 4 was manufactured in the same manner and the same dimension as in Example 38, with the exception that the mixing ratio shown in Table 4 below was used, and the alkali-activated binder used for the alkali-activated masonry product 4 included GGBS, calcium hydroxide and sodium silicate, in which calcium hydroxide was used in an amount of about 5 parts by weight based on 100 parts by weight of the raw material and the weight ratio of Na or $Na_2O$ contained in the sodium-containing inorganic alkaline material, namely sodium silicate to the raw material was calculated to be 0.03.

TABLE 4

| Weight per Unit Volume (kgf/m³) | | | | | |
|---|---|---|---|---|---|
| GGBS | Sodium Silicate | Water Glass | Calcium Hydroxide | Water | Fine Aggregate |
| 199 | 14 | — | 10 | 128 | 1833 |

Example 42

An alkali-activated masonry product 5 was manufactured in the same manner and the same dimension as in Example 38, with the exception that the mixing ratio shown in Table 5 below was used, and the alkali-activated binder used for the alkali-activated masonry product 5 included GGBS, calcium hydroxide and sodium silicate, in which calcium hydroxide was used in an amount of about 5 parts by weight based on 100 parts by weight of the raw material and the weight ratio of Na or $Na_2O$ contained in the sodium-containing inorganic alkaline material, namely sodium silicate to the raw material was calculated to be 0.06.

TABLE 5

| Weight per Unit Volume (kgf/m³) | | | | | |
|---|---|---|---|---|---|
| GGBS | Sodium Silicate | Water Glass | Calcium Hydroxide | Water | Fine Aggregate |
| 186 | 27 | — | 9 | 113 | 1829 |

Example 43

A lightweight brick and a lightweight block were manufactured in the same manner as in Example 38, with the exception that artificial lightweight aggregate was used in lieu of the fine aggregate in Table 1. As such, the alkali-activated binder included GGBS and calcium hydroxide, and calcium hydroxide was used in an amount of about 5 parts by weight based on 100 parts by weight of the raw material.

Example 44

A lightweight brick and a lightweight block were manufactured in the same manner as in Example 38, with the exception that artificial lightweight aggregate was used in lieu of the fine aggregate in Table 2. As such, the alkali-activated binder included GGBS and calcium hydroxide, and calcium hydroxide was used in an amount of about 10 parts by weight based on 100 parts by weight of the raw material.

Example 45

A lightweight brick and a lightweight block were manufactured in the same manner as in Example 38, with the exception that the mixing ratio shown in Table 6 below was used. As such, the alkali-activated binder included GGBS and calcium hydroxide, and calcium hydroxide was used in an amount of about 15 parts by weight based on 100 parts by weight of the raw material.

TABLE 6

| | Weight per Unit Volume (kgf/m$^3$) | | | | |
|---|---|---|---|---|---|
| GGBS | Sodium Silicate | Water Glass | Calcium Hydroxide | Water | Artificial lightweight aggregate |
| 213 | — | — | 32 | 134 | 1896 |

Example 46

A lightweight brick and a lightweight block were manufactured in the same manner as in Example 38, with the exception that the mixing ratio shown in Table 7 below was used. As such, the alkali-activated binder included GGBS and barium hydroxide, and barium hydroxide was used in an amount of about 0.5 parts by weight based on 100 parts by weight of the raw material.

TABLE 7

| | Weight per Unit Volume (kgf/m$^3$) | | | | |
|---|---|---|---|---|---|
| GGBS | Sodium Silicate | Water Glass | Barium Hydroxide | Water | Artificial lightweight aggregate |
| 212 | — | — | 1.1 | 181 | 1836 |

Example 47

A lightweight brick and a lightweight block were manufactured in the mixing ratio as shown in Table 7 in the same manner as in Example 38, with the exception that 5.5 kg of barium hydroxide was used. As such, the alkali-activated binder included GGBS and barium hydroxide, and barium hydroxide was used in an amount of about 2.5 parts by weight based on 100 parts by weight of the raw material.

Example 48

A light brick and a light block were manufactured in the mixing ratio as shown in Table 7 in the same manner as in Example 38, with the exception that 11 kg of barium hydroxide was used. As such, the alkali-activated binder included GGBS and barium hydroxide, and barium hydroxide was used in an amount of about 5 parts by weight based on 100 parts by weight of the raw material.

Examples 49 to 56

A block was manufactured in the same manner as in Example 38, with the exception that mixing was performed under conditions of Table 8 below. In Examples 49, 51, 53, 55, calcium hydroxide was used in an amount of about 2.5 parts by weight based on 100 parts by weight of the raw material, and in Examples 50, 52, 54, 56, calcium hydroxide was used in an amount of about 5 parts by weight based on 100 parts by weight of the raw material. Furthermore, the weight ratio of Na or Na$_2$O contained in the sodium-containing inorganic alkaline material, namely sodium sulfate to the raw material was calculated to be 0.007 in Examples 49 and 50, 0.014 in Examples 51 and 52, 0.021 in Examples 53 and 54, and 0.028 in Examples 55 and 56.

TABLE 8

| | Weight per Unit Volume (kgf/m$^3$) | | | |
|---|---|---|---|---|
| | GGBS | Calcium Oxide | Sodium Sulfate | Water | Fine Aggregate |
| Ex. 49 | 384 | 10 | 5 | 120 | 1200 |
| Ex. 50 | 374 | 20 | 5 | 120 | 1200 |
| Ex. 51 | 378 | 10 | 10 | 120 | 1200 |
| Ex. 52 | 368 | 20 | 10 | 120 | 1200 |
| Ex. 53 | 372 | 10 | 15 | 120 | 1200 |
| Ex. 54 | 362 | 20 | 15 | 120 | 1200 |
| Ex. 55 | 366 | 10 | 20 | 120 | 1200 |
| Ex. 56 | 356 | 20 | 20 | 120 | 1200 |

Comparative Examples 1 to 5

Comparative products 1 to 5 were manufactured in the same manner and the same dimension as in Example 38, with the exception that mixing was performed under conditions of Table 9 below.

TABLE 9

| | Binder | Activator | Water/Raw material | Na$_2$O/Raw material |
|---|---|---|---|---|
| C. Ex. 1 | GGBS | Sodium Silicate | 0.49 | 0.015 |
| C. Ex. 2 | GGBS | Sodium Silicate | 0.48 | 0.025 |
| C. Ex. 3 | Fly ash | Sodium Silicate | 0.51 | 0.045 |
| C. Ex. 4 | GGBS | Water Glass | 0.50 | 0.025 |
| C. Ex. 5 | Fly ash | Water Glass | 0.43 | 0.045 |

Test Example 14

The compressive strength of the masonry products 1 to 5 of Examples 38 to 5 was tested. The results are shown in FIG. 22.

Figure 22:
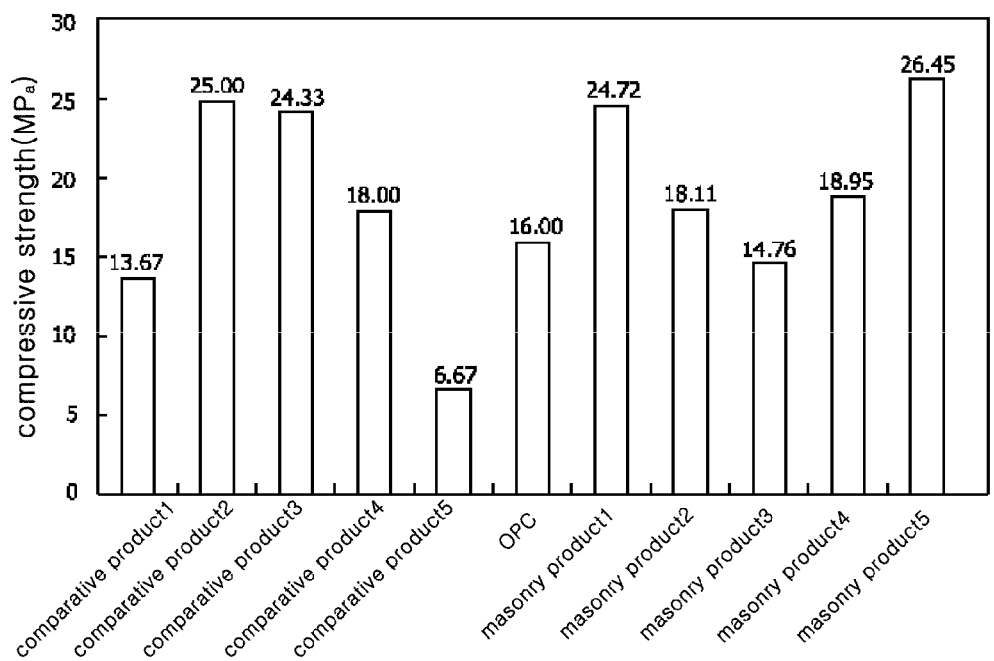
FIG. 22 is a graph showing the compressive strength of the alkali-activated masonry products 1 to 5 of Examples 38 to 42 according to the present invention.

In FIG. 22, OPC indicates the compressive strength of a brick manufactured from typical Portland cement and is represented by 16.0. The compressive strength of bricks (comparative products 1 to 5 of Comparative Examples 1 to 5) manufactured using, in lieu of Portland cement, the alkali-activated inorganic binder including the raw material (blast furnace slag) and the sodium-based inorganic alkaline material is depicted to the left of OPC, whereas the compressive strength of bricks (masonry products 1 to 5 of Examples 38 to 42) using, in lieu of Portland cement, the alkali-activated inorganic binder including the raw material (blast furnace slag) and the sodium-free inorganic alkaline material (e.g. calcium hydroxide), and including the raw material (blast furnace slag), the sodium-free inorganic alkaline material (e.g. calcium hydroxide) and the sodium-based inorganic alkaline material is depicted to the right of OPC.

With reference to FIG. 22, even when the alkali-activated binder including the raw material and the sodium-free inorganic alkaline material (e.g. calcium hydroxide) is used, the resultant bricks can have compressive strength superior to that of bricks resulting from typical Portland cement. Also, as the weight ratio of Na or $Na_2O$ contained in the sodium-based inorganic alkaline material of the masonry product to the raw material is larger, the compressive strength can be enhanced by the addition of the sodium-free inorganic alkaline material (e.g. calcium hydroxide).

Test Example 15

The absorption rate of the masonry products 1 to 5 of Examples 38 to 42 was tested. The results are shown in FIG. 23.

Figure 23:
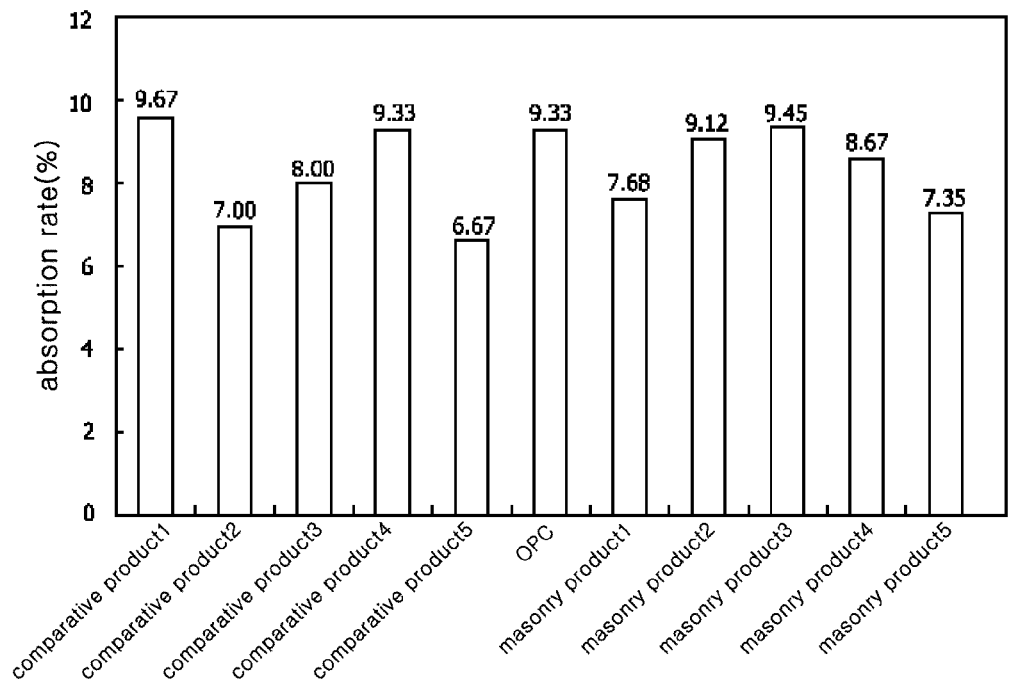
FIG. 23 is a graph showing the absorption rate of the alkali-activated masonry products 1 to 5 of Examples 38 to 42 according to the present invention.

In FIG. 23, OPC indicates the absorption rate of a brick manufactured from typical Portland cement and is represented by 9.33.

The absorption rate of bricks (comparative products 1 to 5 of Comparative Examples 1 to 5) manufactured using, in lieu of Portland cement, the alkali-activated inorganic binder including the raw material (blast furnace slag) and the sodium-based inorganic alkaline material is depicted to the left of the OPC, whereas the absorption rate of bricks (masonry products 1 to 5 of Examples 38 to 42) using, in lieu of Portland cement, the alkali-activated inorganic binder including the raw material (blast furnace slag) and the sodium-free inorganic alkaline material (e.g. sodium hydroxide), and including the raw material (blast furnace slag), the sodium-free inorganic alkaline material (e.g. sodium hydroxide) and the sodium-based inorganic alkaline material is depicted to the right of the OPC.

With reference to FIG. 23, compared to when the alkali-activated binder includes the raw material and the sodium-based inorganic alkaline material, when the alkali-activated binder includes the raw material and the sodium-free inorganic alkaline material or includes the raw material, the sodium-based inorganic alkaline material and the sodium-free inorganic material, the absorption rate of the masonry products 1 to 5 is wholly lower and the properties thereof are superior to those of bricks using typical Portland cement or including only the sodium-containing inorganic alkaline material.

Test Example 16

The compressive strength of the lightweight bricks and lightweight blocks of Examples 43 to 45 and of the lightweight bricks and lightweight blocks of Examples 46 to 48 was tested. The results are shown in FIGS. 24 and 25.

Figure 24:
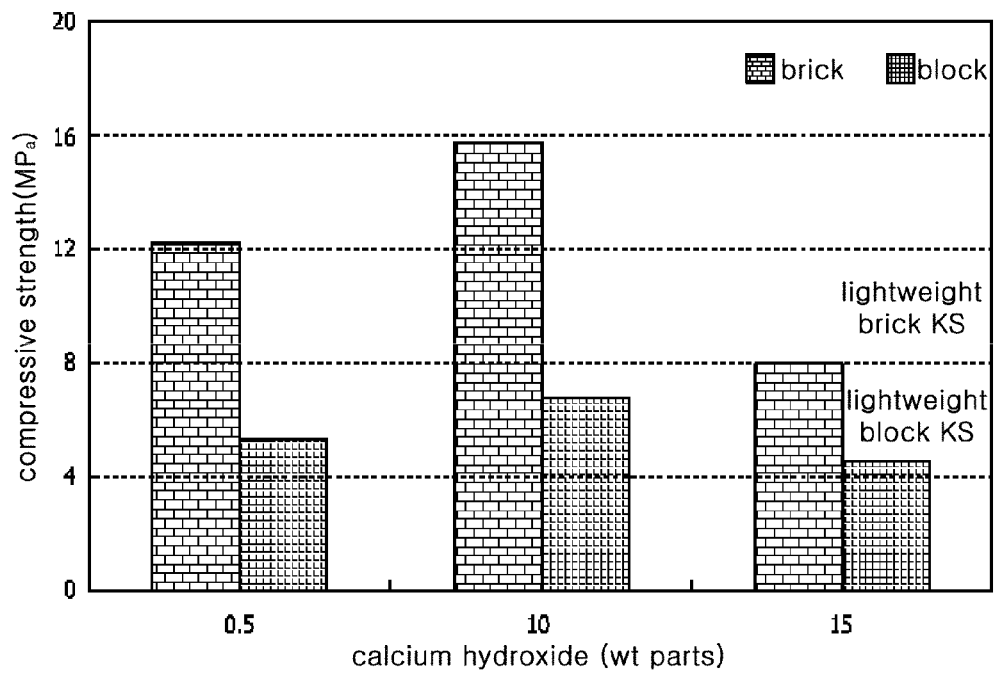
FIG. 24 is a graph showing the amount of calcium hydroxide contained in the alkali-activated binder used for the lightweight blocks and lightweight bricks of Examples 43 to 45 according to the present invention versus the 28-day compressive strength.
Figure 25:
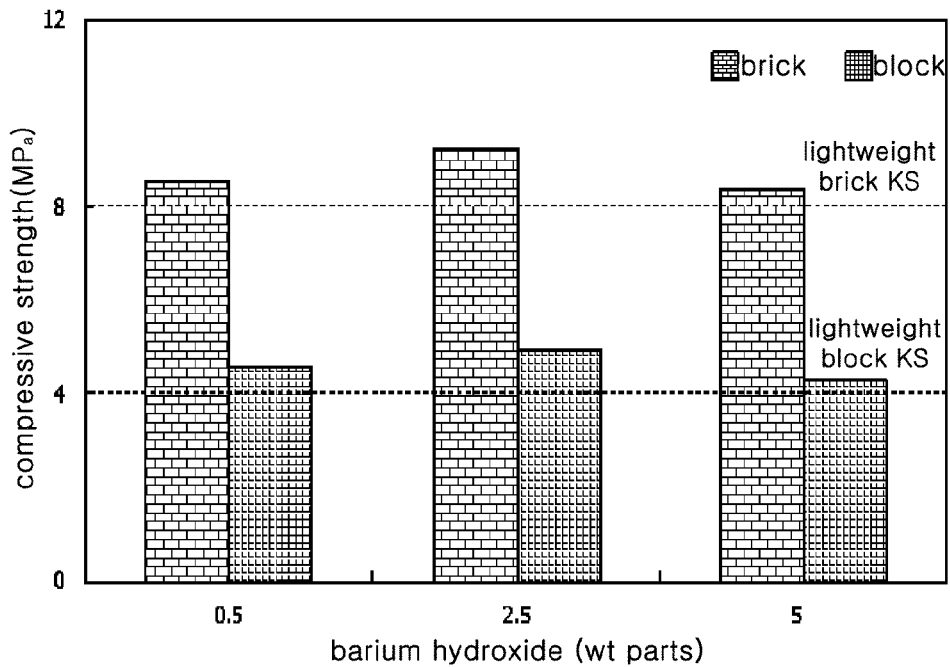
FIG. 25 is a graph showing the amount of barium hydroxide contained in the cement-free alkali-activated binder used for the lightweight blocks and lightweight bricks of Examples 46 to 48 according to the present invention versus the 28-day compressive strength.

As shown in FIGS. 24 and 25, the compressive strength of the lightweight bricks and lightweight blocks of Examples 43 to 48 was adapted for the KS standard, suitable for use in lightweight bricks and lightweight blocks.

Test Example 17

The compressive strength of the blocks of Examples 49 to 56 was tested. The results are shown in FIG. 26.

Figure 26:
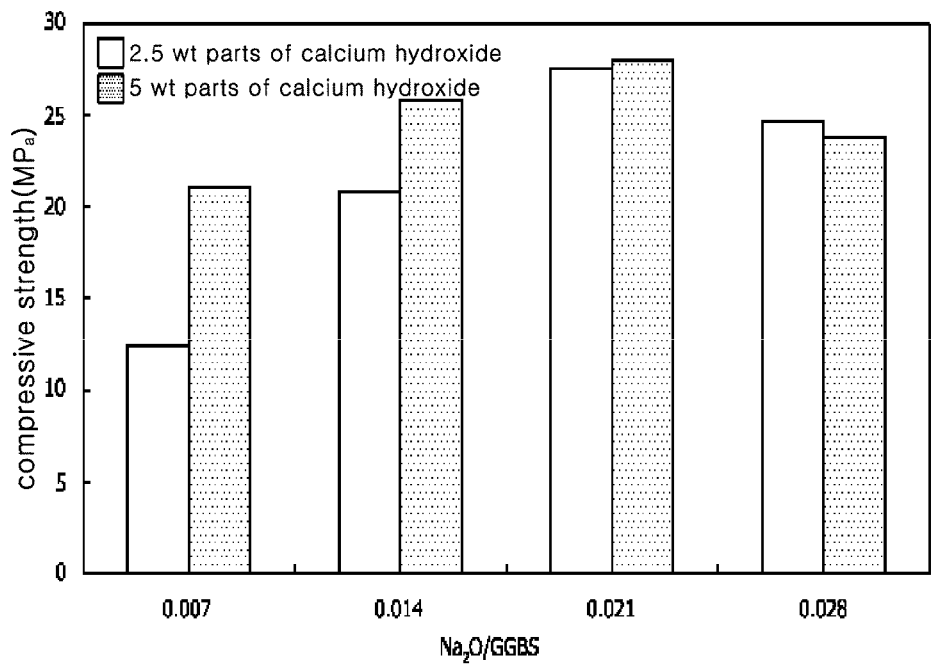
FIG. 26 is a graph showing the amounts of calcium hydroxide and sodium sulfate contained in the cement-free alkali-activated binder used for the blocks of Examples 49 to 56 according to the present invention versus the 28-day compressive strength.

As shown in FIG. 26, the compressive strength of the blocks of Examples 49 to 56 was increased in proportion to an increase in amount of calcium hydroxide when the addition of sodium sulfate was low, but had almost no relation to the amount of calcium hydroxide when the addition ($Na_2O$/raw material) of sodium sulfate was 0.014 or more. When the addition ($Na_2O$/raw material) of sodium sulfate was 0.021, the compressive strength was the greatest regardless of the amount of calcium hydroxide.

Thus, when the inorganic alkaline material including both calcium hydroxide and sodium sulfate having high price competitiveness is used, masonry products having superior strength, improved workability and high price competitiveness can be obtained.

According to the present invention, the alkali-activated masonry products including both general masonry products and lightweight masonry products can be manufactured in various forms, dimensions, and weights at low cost and with very superior properties, and thus can be utilized as a building material in construction sites. In particular, such masonry products can be variously employed in the masonry field of the construction industries.

Although not specifically described, even when fly ash was used instead of the blast furnace slag of the alkali-activated binder used for the examples and the test examples, similar results could be obtained.

Example 57

Preparation of Alkali-Activated Binder 100 parts by weight of GGBS, 5 parts by weight of magnesium chloride powder, and 10 parts by weight of calcium hydroxide were uniformly mixed, thus manufacturing an alkali-activated binder 36. Also, the alkali-activated binder 15 manufactured by uniformly mixing 100 parts by weight of GGBS and 10 parts by weight of magnesium nitrate powder as in Example 16 was prepared.

Example 58

Manufacture of Alkali-Activated Wet Loess Paving Material 1

1. 100 parts by weight of the alkali-activated binder 36, 100 parts by weight of coarse aggregate, and 15 parts by weight of fine aggregate were dry mixed using a forced mixer for 1 minute, thus obtaining a dry mixture.
2. Water was admixed with 0.5 parts by weight of a high-efficiency water-reducing agent and 10 parts by weight of PET fibers, thus obtaining a liquid admixture. The ratio (W/B) of water (W) and the cement-free alkali-activated binder (B) was 40%, and fibers were efficiently dispersed in order to prevent the balling of fibers.
3. The dry mixture was mixed with the liquid admixture for 30 seconds or longer, thus obtaining a wet mixture.
4. The wet mixture was added with 60 parts by weight of loess and uniformly mixed for 1 minute 30 seconds, thus manufacturing an alkali-activated wet loess paving material 1. As such, the amount of loess was adjusted in consideration of the desired slump.

Examples 59 to 61

Manufacture of Alkali-Activated Wet Loess Paving Materials 2 to 4

Alkali-activated wet loess paving materials 2 to 4 were obtained in the same manner as in Example 58, with the exception that the water ratio, namely the ratio (W/B) of water (W) to cement-free alkali-activated binder (B) was 45%, 50%, and 65%, respectively.

Examples 62 to 64

Manufacture of Alkali-Activated Wet Loess Paving Materials 5 to 7

Alkali-activated wet loess paving materials 5 to 7 were obtained in the same manner as in Example 58, with the exception that the alkali-activated binder 15 was used, and the water ratio, namely the ratio (W/B) of water (W) to alkali-activated binder (B) was 45%, 50%, and 52.5%, respectively.

Test Example 18

The alkali-activated wet loess paving materials 1 to 4 were tested for the 28-day compressive strength and the slump depending on the water ratio in the wet loess paving material, namely the ratio (W/B) of water (W) to cement-free alkali-activated binder (B). The results are graphed in FIGS. 27 and 28.

Figure 27:
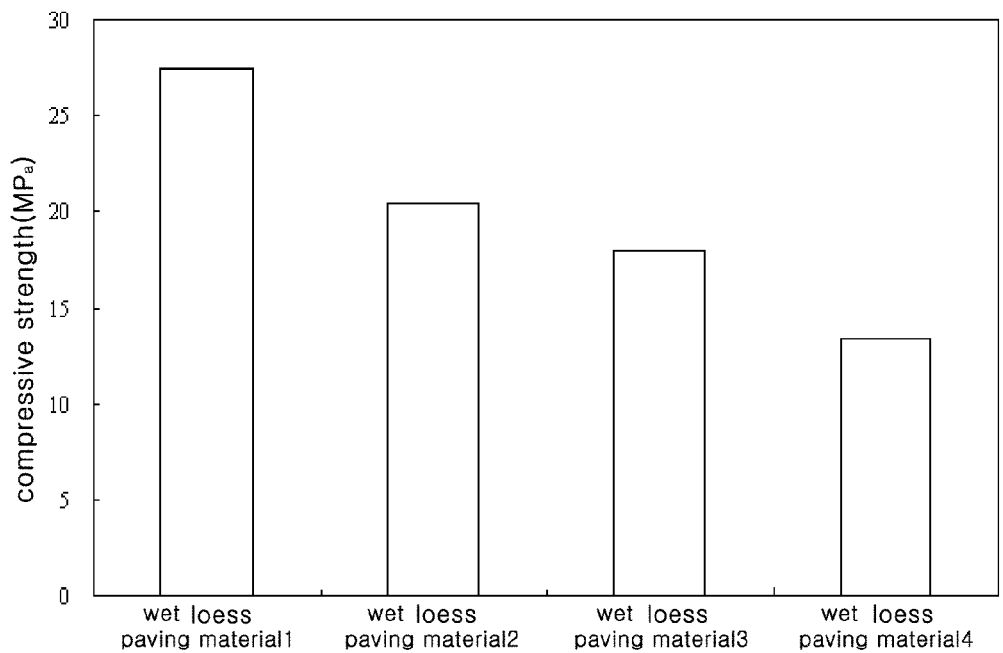
FIG. 27 is a graph showing the compressive strength depending on days of the alkali-activated wet loess paving materials 1 to 4 manufactured in the examples according to the present invention.
Figure 28:
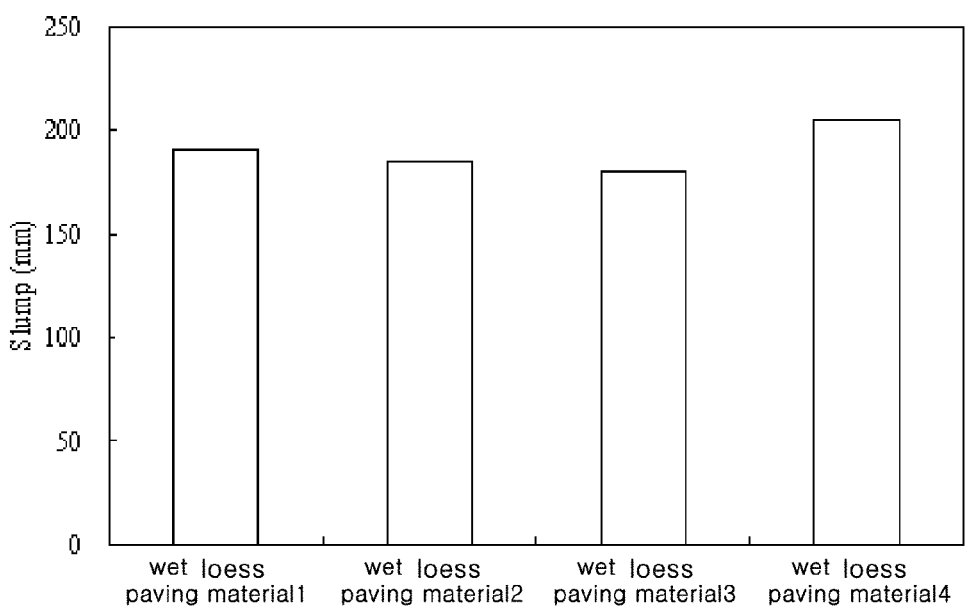
FIG. 28 is a graph showing the slump of the alkali-activated wet loess paving materials 1 to 4 manufactured in the examples according to the present invention.

With reference to FIGS. 27 and 28 showing the results of Test Example 2, when the amount of alkali-activated binder 36 contained in the alkali-activated wet loess paving material was constant, the compressive strength was decreased in proportion to an increase in the water ratio (W/B), and the slump was slightly decreased up to the water ratio (W/B) of 0.5 and then increased.

Test Example 19

The alkali-activated wet loess paving materials 5 to 7 were tested for the 28-day compressive strength and the slump depending on the water ratio in the wet loess paving material, namely the ratio (W/B) of water (W) to alkali-activated binder (B). The results are graphed in FIGS. 29 and 30.

Figure 29:
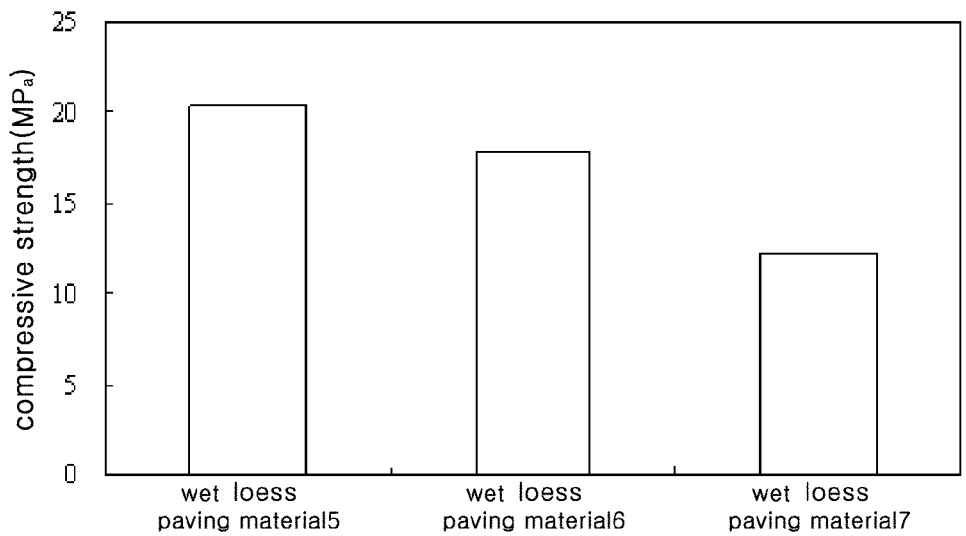
FIG. 29 is a graph showing the compressive strength depending on days of the alkali-activated wet loess paving materials 5 to 7 manufactured in the examples according to the present invention.
Figure 30:
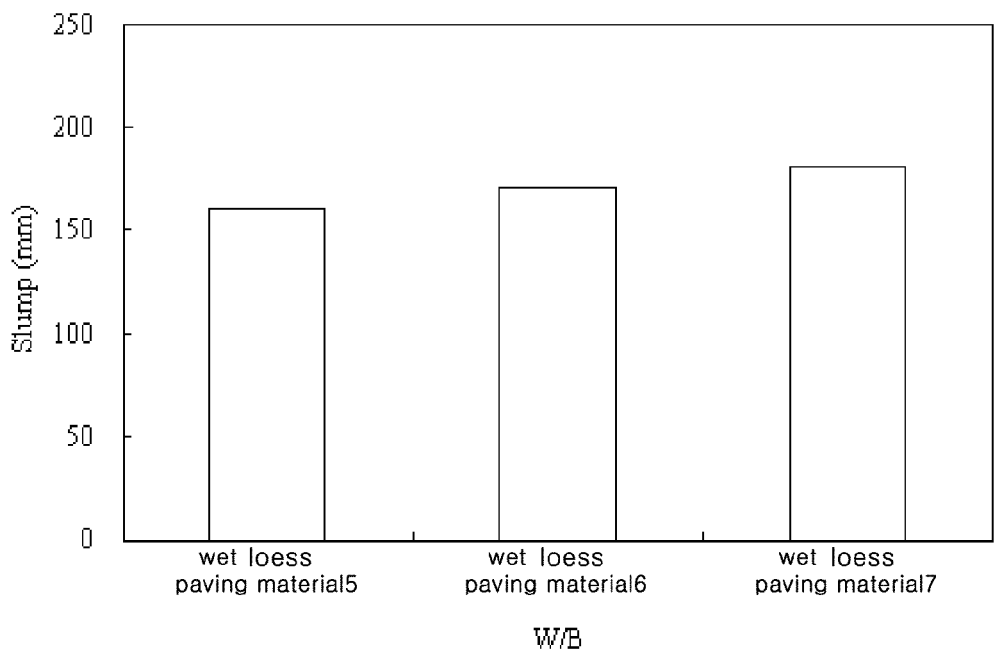
FIG. 30 is a graph showing the slump of the alkali-activated wet loess paving materials 5 to 7 manufactured in the examples according to the present invention.

With reference to FIGS. 29 and 30 showing the results of Test Example 19, when the amount of alkali-activated binder 15 contained in the alkali-activated wet loess paving material was constant, the compressive strength was decreased in proportion to an increase in the water ratio (W/B), but the slump was increased.

Test Example 20

The standard mixing ratio of the alkali-activated wet loess paving material may be classified into high-strength mixing and normal-strength mixing in consideration of the end uses thereof and profitability. The high-strength mixing was performed by lowering the water-cement ratio (hereinafter referred to as "W/C") so that compressive strength was enhanced, and fine aggregate was added to ensure the desired slump at low W/C. The normal-strength mixing was performed under conditions of the amount of mixed loess being higher than in the high-strength mixing.

Thus, a high-strength wet loess paving material comprising, based on 100 parts by weight of the alkali-activated binder, 50~160 parts by weight of loess, 80~140 parts by weight of coarse aggregate, 0.5~1.5 parts by weight of an additive, 10~20 parts by weight of fibers, and 10~48 parts by weight of fine aggregate, and a normal-strength wet loess paving material comprising, based on 100 parts by weight of the alkali-activated binder, 100~240 parts by weight of loess, 170~300 parts by weight of coarse aggregate, 0.5~1.5 parts by weight of an additive, and 15~35 parts by weight of fibers were tested for their compressive strength depending on the days. The results are shown in FIG. 31.

Figure 31:
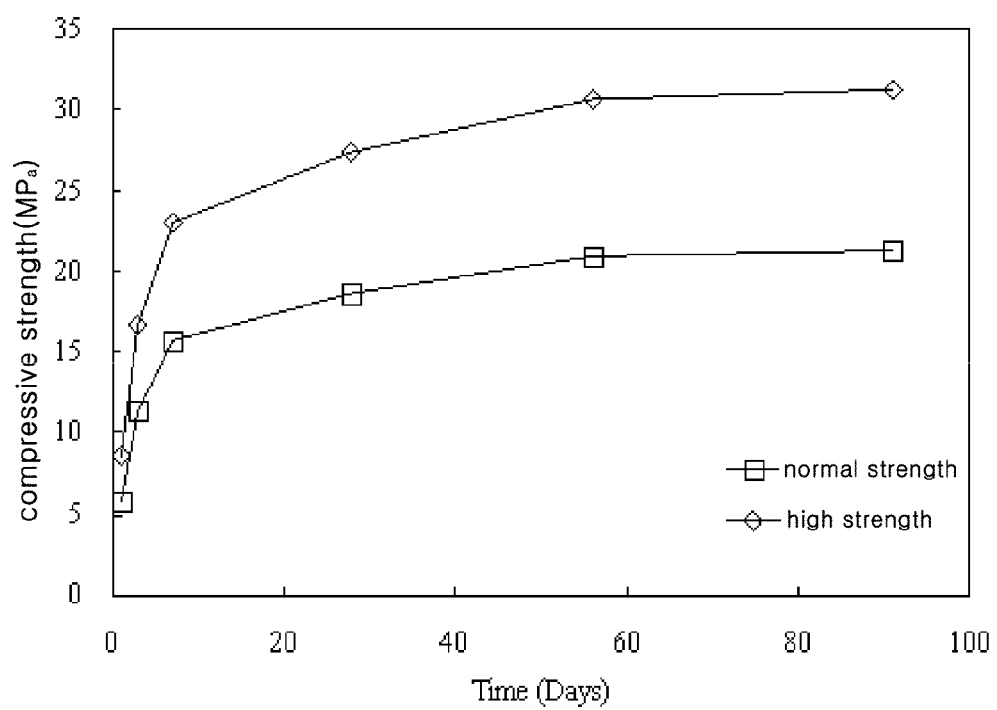
FIG. 31 is a graph showing the compressive strength depending on days of the high-strength alkali-activated wet loess paving material and the normal-strength alkali-activated wet loess paving material according to the present invention.

As shown in FIG. 31, the high-strength wet loess paving material can exhibit a compressive strength of 25~30 MPa, and the normal-strength wet loess paving material can have a compressive strength of 18~24 MPa.

Although not shown in the examples, the above test results were also similar when the inorganic alkaline material contained in the alkali-activated binder was changed, namely when the sodium-containing inorganic alkaline material and the sodium-free inorganic alkaline material were used separately or together. Furthermore, even when fly ash was used instead of the blast furnace slag of the alkali-activated binder used for the above examples and test examples, similar results could be obtained.

Upon paving the alkali-activated wet loess paving material according to the present invention, the course configuration and thickness are designed depending on the conditions of the traffic load, road conditions, conditions of mixing materials, and environmental conditions, and may be determined considering profitability. The bending stress generated in surface course of the alkali-activated wet loess paving material is formed in the sequence of subgrade, subbase course, and surface course, and thus the paving thickness may be calculated as follows.

$$h_1^2 = 2.4P \div \sigma \times C$$

wherein $h_1$: thickness of surface course of loess paving material (mm), P: design wheel load, $\sigma$: flexural strength of wet loess paving (MPa), and C: coefficient of bearing capacity of road base, represented by 0.85.

The paving thickness depending on the end uses of the alkali-activated wet loess paving material according to the present invention is given in Table 10, and the 28-day compressive strength is shown in Table 11 below.

TABLE 10

| | Traffic Volume (numbers of vehicles/day + direction) | Design Wheel Load (kg) | Thickness of Paving Material (mm) | Flexural Strength (MPa) | Application |
|---|---|---|---|---|---|
| 1 | Sidewalks, Bicycle Roads | 1,000 | 100 | 2.0 | sidewalks, bicycle roads |
| 2 | Less than 200 | 3,000 | 150 | 2.7 | plazas, small parking lots |
| 3 | 200 or more | 6,000 | 200 | 3.0 | light traffic routes, large parking lots |

TABLE 11

| | Compressive Strength (at 28 days, MPa) | | Note |
|---|---|---|---|
| Cement-free wet loess paving material | Normal-strength | 18.0 or more | typical walkways, bicycle roads |
| | High-strength | 27.0 or more | plazas, parking lots, light traffic routes |

Thus, the alkali-activated wet loess paving material according to the present invention can be applied instead of asphalt or concrete to places that do not encounter heavy traffic loads, such as walkways, sidewalks, park roads, bicycle roads, playgrounds, plazas, parking lots, sightseeing complexes, temples, cultural ruins, farm roads, forest roads, roads of residential streets, and farming water ways, and to places requiring high strength to enable the passage of heavy vehicles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cement-free alkali-activated binder, comprising:
   slag or fly ash; and
   a magnesium salt in an amount of 0.5-30 parts by weight based on 100 parts by weight of slag or fly ash, wherein the magnesium salt is any one selected form the group consisting of magnesium stearate, magnesium metaphosphate, and magnesium lactate.

2. The cement-free alkali-activated binder of claim 1, wherein the magnesium salt is used in an amount of 0.5-20 parts by weight based on 100 parts by weight of the slag or fly ash.

3. An alkali-activated mortar, comprising the alkali-activated binder of claim 1.

4. A cement-free alkali-activated concrete, comprising the cement-free alkali-activated binder of claim 1.

5. A cement-free alkali-activated concrete product, manufactured from the cement-free concrete of claim 4.

6. The concrete product of claim 5, wherein the concrete product comprises a brick, a block, tile, a drainpipe, curbstone, a concrete pile, prestressed concrete, a concrete panel, a concrete pipe, a manhole, foamed concrete, and a concrete structure.

7. An alkali-activated masonry product, comprising: the alkali-activated binder of claim 1; fine aggregate, comprising one or more selected from the group consisting of sand, waste foundry sand, stone powder, and artificial lightweight aggregate; and water.

8. An alkali-activated wet loess paving material, comprising: an alkali-activated binder comprising slag or fly ash and sodium-free inorganic alkaline material, loess, coarse aggregate, an additive, fibers, and water, wherein the water is used so that a ration (W/B) of water (W) to alkali-activated binder (B) is 40-65%.

9. The alkali-activated wet loess paving material of claim 8, wherein the additive is polycarbonic acid-based water-reducing agent and is in an amount of 0.5-1.5 parts by weight based on 100 parts by weight of the alkali-activated binder.

10. The alkali-activated wet loess paving material of claim 8, wherein the fibers are in an amount of 10-35 parts by weight based on 100 parts by weight of the alkali-activated binder.

11. The alkali-activated wet loess paving material of claim 8, further comprising fine aggregate which has a diameter of 5 mm of or less and is used to substitute for 20-30 wt % of the loess.

12. The alkali-activated wet loess paving material of claim 8, further comprising a sodium-containing inorganic material comprising one or more selected from the group consisting of sodium silicate, sodium sulfate, powdery sodium hydroxide, liquid water glass, and liquid sodium hydroxide.

13. The alkali-activated wet loess paving material of claim 8, wherein when 50-160 parts by weight of the loess, 80-140 parts by weight of the coarse aggregate, 0.5-1.5 parts by weight of the additive, 10-20 parts by weight of the fibers, and 10-48 parts by weight of the fine aggregate are used based on 100 parts by weight of the alkali-activated binder, a compressive strength of 25-30 MPa is obtained.

14. The alkali-activated wet loess paving material of claim 8, wherein when 100-240 parts by weight of the loess, 170-300 parts by weight of the coarse aggregate, 0.5-1.5 parts by weight of the additive, and 15-35 parts by weight of the fibers are used based on 100 parts by weight of the alkali-activated binder, a compressive strength of 18-24 MPa is obtained.

* * * * *